United States Patent [19]
Ballard et al.

[11] Patent Number: 6,088,041
[45] Date of Patent: Jul. 11, 2000

[54] METHOD OF DROPOUT CONTROL FOR SCAN CONVERSION OF A GLYPH COMPRISING A PLURALITY OF DISCRETE SEGMENTS

[75] Inventors: Dean Dayton Ballard, Seattle; Eliyezer Kohen, Mercer Island, both of Wash.

[73] Assignee: Microsoft Corporation, Redmond, Wash.

[21] Appl. No.: 08/884,535

[22] Filed: Jun. 27, 1997

Related U.S. Application Data

[62] Division of application No. 08/368,415, Jan. 3, 1995, Pat. No. 5,790,126.

[51] Int. Cl.$^7$ .................................................. G06T 9/00
[52] U.S. Cl. .................................... 345/467; 345/468
[58] Field of Search ................................. 345/467, 468, 345/469, 470, 471, 472; 382/163

[56] References Cited

U.S. PATENT DOCUMENTS

| | | | |
|---|---|---|---|
| 5,068,803 | 11/1991 | Valdes et al. | 345/170 |
| 5,155,805 | 10/1992 | Kaasila | 345/469 |
| 5,200,740 | 4/1993 | Paxton et al. | 345/141 |
| 5,233,336 | 8/1993 | Byron et al. | 345/25 |
| 5,255,357 | 10/1993 | Byron et al. | 345/170 |
| 5,301,267 | 4/1994 | Hassett et al. | 345/469 |
| 5,355,449 | 10/1994 | Lung et al. | 345/467 |
| 5,381,521 | 1/1995 | Ballard | 345/442 |
| 5,408,598 | 4/1995 | Pryor, Jr. | 345/442 |
| 5,422,990 | 6/1995 | Sivlerbrook et al. | 345/442 |
| 5,428,728 | 6/1995 | Lung et al. | 345/469 |
| 5,454,070 | 9/1995 | Donelly et al. | 345/431 |
| 5,579,030 | 11/1996 | Karrow | 345/471 |
| 5,598,520 | 1/1997 | Harel et al. | 345/469 |
| 5,623,558 | 4/1997 | Billawala et al. | 383/254 |
| 5,684,510 | 11/1997 | Brassell et al. | 345/443 |
| 5,790,126 | 8/1998 | Ballard et al. | 345/468 |
| 5,857,067 | 1/1999 | Hassett et al. | 345/441 |
| 5,867,173 | 2/1999 | Ballard et al. | 345/468 |

FOREIGN PATENT DOCUMENTS

| | | |
|---|---|---|
| WO/94/06094 | 3/1994 | WIPO . |
| WO/94/29843 | 12/1994 | WIPO . |

OTHER PUBLICATIONS

J. Hobby, "Rasterization of Nonparametric Curves," *ACM Transactions on Graphics*, vol. 9. No. 3, Jul. 1900, pp. 262–277.

W. Newman and R. Sproull, "Solid–Area Scan Conversion", Chapter 16, *Principles of Interactive Computer Graphics*, pp. 229–245, 2d edition, 1979.

Foley et al., *Computer Graphics Principles and Practice*, Second Edition, Chapter 3, Section 3.17, Addison Wesley, pp. 132–143, 1990.

*Primary Examiner*—Stephen S. Hong
*Attorney, Agent, or Firm*—Jones & Askew LLP

[57] ABSTRACT

An improved scan converter to support the efficient and accurate display of character outlines by pixel-oriented display devices. To conserve the finite resource of memory, the improved scan converter supports an efficient use of available memory workspace by accurately determining an upper bound for the amount of memory required to support scan conversion calculations. To achieve improvements in speed and character image quality, the improved scan converter renders the spline segments of a character outline by using a second order equation to calculate an implicit function based on the control points of each segment. The improved scan converter further addresses in a systematic manner the rendering of an endpoint located on a scan line to determine whether the pixel associated with the endpoint should be activated. This decision is based upon the direction of approach to and exit from this endpoint for the pair of segments connected to the endpoint. The improved scan converter also reduces the number of calculations requiring sub-pixel precision to support the selection of a pixel located nearest the contour, thereby providing an improved solution for dropout condition.

16 Claims, 11 Drawing Sheets

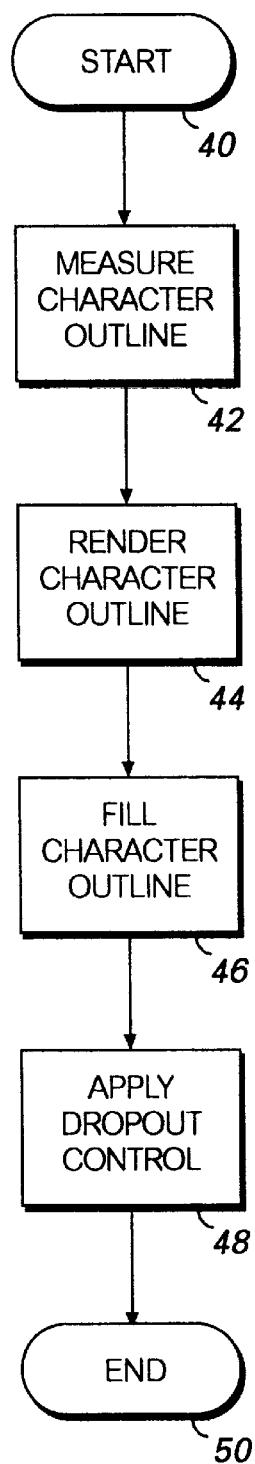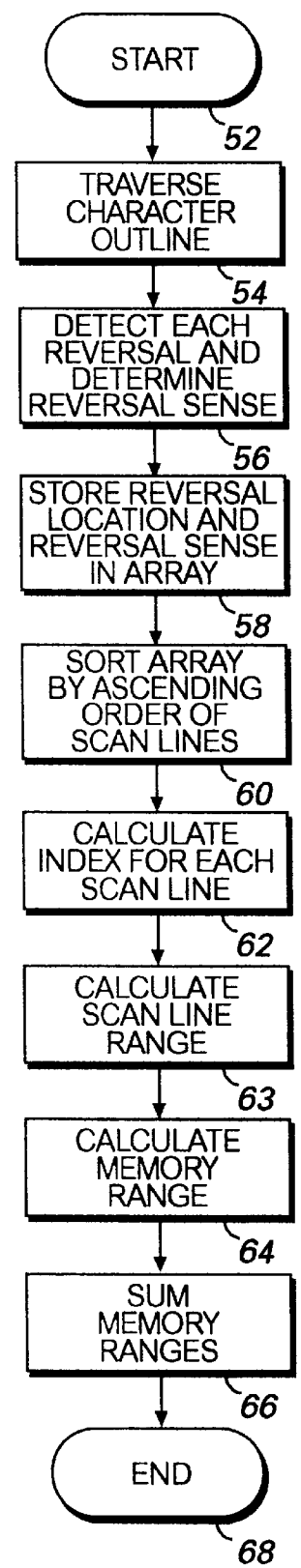
FIG. 4    FIG. 5

FIG.13A BEFORE DROPOUT CONTROL

FIG.13B AFTER DROPOUT CONTROL

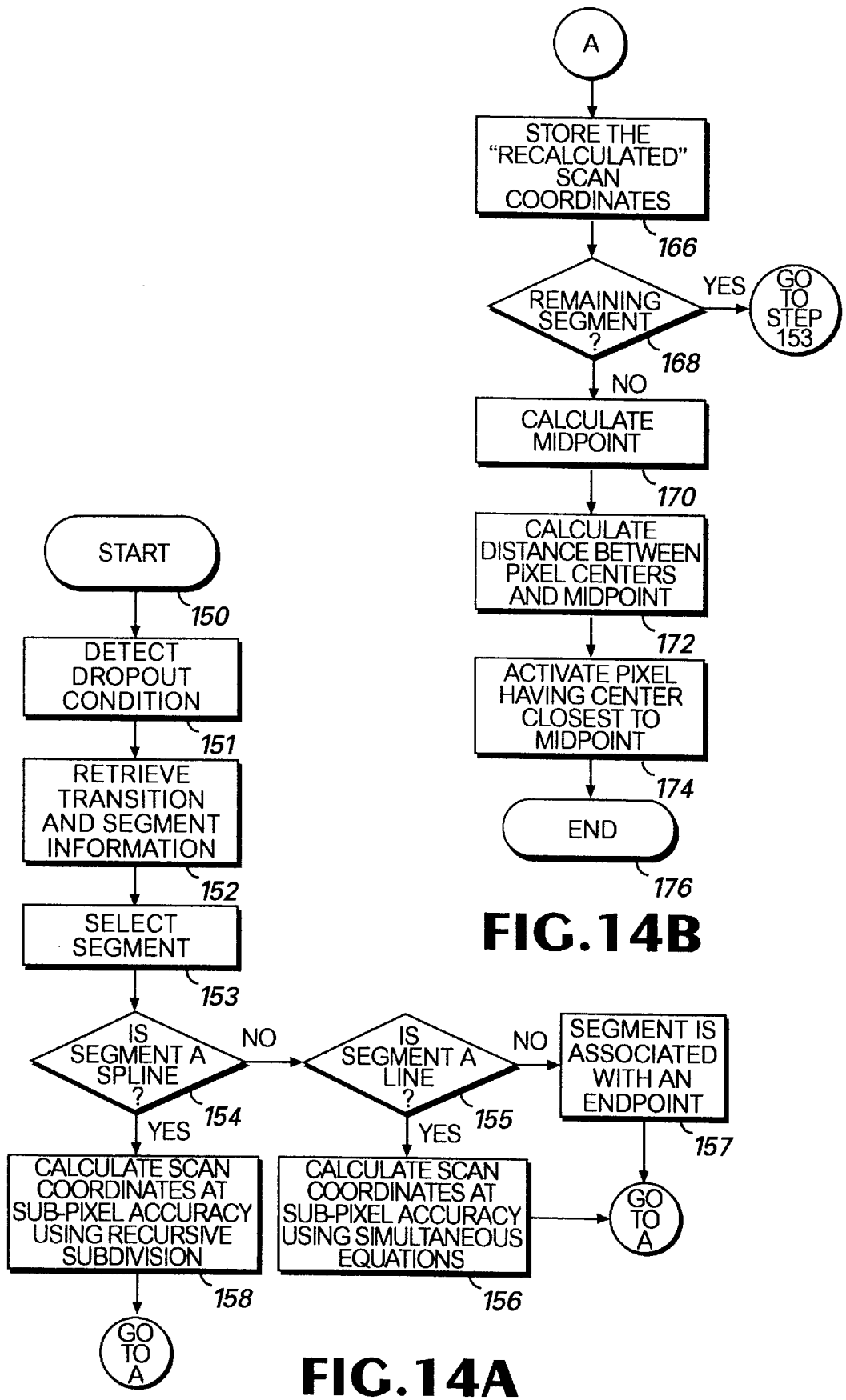

METHOD OF DROPOUT CONTROL FOR SCAN CONVERSION OF A GLYPH COMPRISING A PLURALITY OF DISCRETE SEGMENTS

CROSS REFERENCE TO RELATED APPLICATION

This application is a division of application Ser. No. 08/368,415, filed Jan. 3, 1995is now U.S. Pat. No. 5,790,126, entitled IMPROVED SCAN CONVERSION SYSTEM.

TECHNICAL FIELD

The invention relates generally to font technology and, more specifically, to an improved scan conversion system for supplying a character bitmap defining pixels to be activated on pixel-oriented display devices.

BACKGROUND OF THE INVENTION

Most general purpose computer systems support a display of text-based characters, including letters, numerals, and other symbols, on pixel-oriented display devices. A pixel is a discrete segment of an overall field in which an image can be displayed. Although pixels are typically square or round in shape for most devices, many newer pixel-oriented display devices include rectangular pixels. A pixel is activated or "turned on" when the process that generates the display determines that it is appropriate to activate that portion of the image field. Accordingly, the display surface for a pixel-oriented display device consists of a grid of points, or pixels, each of which can be individually illuminated or "darkened" to display an image. Common pixel-oriented display devices are raster scan cathode ray tube (CRT) displays, liquid crystal display (LCD) displays, dot matrix printers, and laser printing devices.

In general, to display text on a pixel-oriented display device, a computer system utilizes one or more fonts. A font is a collection of characters designed by a typographer in a consistent style. Specifically, a typographer designs a character outline or "glyph" of each character for a particular font, including characters, numbers, punctuation, and any other image for a given font. A particular font refers to selected geometric characteristics of the characters within a character set. A glyph for a given character in a font is described as a numbered sequence of points that are on or off a curve defining the boundary of the character. In general, number sequence for the points should follow a recognized rule for how the points relate to the area to be filled and the area not to be filled when rendering the glyph. For TrueType font descriptions, the points are numbered in consecutive order so that as a path is traversed in the order of increasing point numbers, the filled area will always be to the right of the path. This glyph or outline description of the character is typically stored within a font file maintained by the computer system. TrueType font files are described in the Technical Specification, Revision 1.5, January 1994, entitled "TrueType 1.0 Font Files," by Microsoft Corporation, Redmond, Wash.

In response to the information supplied by a font file, the outline is scaled according to the font size requested by the user and the characteristics of the display device on which it is to be displayed. The outline also may contain hints, which are routines that, when executed, adjust the shapes of the character outlines for various point sizes to improve their appearance. The outline is then scan converted to produce a character bitmap that can be rendered on the selected display device.

A character bitmap represents a grid-like array of pixels and each array element contains a pixel center. The pixel centers are connected in either horizontal or vertical directions by straight lines commonly described as scan lines or reference lines. Each character bitmap contains data reflecting which pixels in a subset of the display grid must be illuminated in order to form an image of a particular character. When a computer system needs to display a particular character at a display location, it accesses the character bitmap for that character. The computer system then turns the illumination of pixels near the display location on or off in accordance with the data stored in the character bitmap. The concept of displaying a character extends to a temporary display, such as a CRT display, as well as a more permanent image creation in the form of a printer.

Using font descriptions, computer systems can now create character bitmaps defining the images to be displayed, also described as raster fonts, dynamically in different typefaces in response to the needs of users. A computer program, which is also described as a rasterizer program, is typically incorporated as part of an operating system or printer control software program to provide this font technology service. The rasterizer program may be called by an application program, such as a word processor or a spreadsheet, when the program requires a raster font. In response to this request, the rasterizer program reads a description of the character outline from a font file stored within a memory storage device. The font file can be stored within either volatile or nonvolatile memory of the computer system or the display device.

The rasterizer program also receives the character's height or "point" size and the predetermined resolution of the intended display device to support the scaling of the character outline. The resolution of a pixel-oriented display device is specified by the number of dots or pixels per inch (dpi) that are to be displayed. This information supports a mapping of the description of the character outline into physical pixel units for the display device to be employed in displaying the character in that particular size. Thus, the geometric description of the character outline is scaled in physical pixel coordinates and represents a function of the predetermined physical pixel size of the display device and the requested point size. This process alters the height and width of the character.

To support the rendering of fonts at low resolution and/or small sizes, the rasterizer program typically includes a routine that analyzes the outlines of fonts and "hints" the fonts according to the size specified by the user in the resolution of the display device. The fundamental task of hinting is to identify critical characteristics of the original font design and to use instructions which adjust the outline to insure that those characteristics will be preserved when the character outline is rendered in different sizes on different devices. Common hinting goals include consistent stem weights, consistent intensity, even spacing, and the elimination of pixel dropouts.

If required, the rasterizer program applies hints to the scaled character outline to fit it to pixel boundaries while distorting the scaled character outline as little as possible. The rasterizer program thereafter conducts a scan conversion operation for the hinted character outline by superimposing a grid corresponding to the horizontal and vertical densities of the intended display device over the hinted outlines, then designating the subset of pixels of the grid whose centers fall within, or precisely on, the hinted outlines as pixels requiring illumination by the display device. The rasterizer program then returns the resulting raster font to the application program, which may use it to display text. The raster font also may be stored within an allocated buffer of computer system memory or display device memory to be used to satisfy any identical request received in the future.

The scan conversion process represents the task of "coloring" inside the lines of the character. For the rasterizer program, a scan converter generates a character bitmap which includes pixels which are activated based upon the relationship of the pixel centers with the character outlines. For conventional scan converters, two rules are generally used to determine if a particular pixel should be turned on or turned off, First, if a pixel's center or reference point falls within the character outline, that pixel is turned on and becomes part of that character outline. Second, if a contour of the character outline falls exactly on a pixel's center, that pixel is turned on. These rules define the conventional "centerpoint" fill method of bitmapping a character outline or glyph and is well known in the art of digital typography.

In general, at the start of a conventional scan conversion process, the character outline is traversed to determine the maximum and minimum coordinate values of the outline. The amount of memory required for the computer system to support the scan conversion tasks is then estimated to insure sufficient workspace memory for the storage of calculation results generated by the rendering operation. Each contour of the character outline is subsequently broken into individual segments of lines and splines and these segments are rendered. The rendering process detects each occurrence of an intersection of a scan line with one of the representations of a line segment or spline segment. Each scan line intersection represents a transition having a particular transition sense, i.e., an on-transition or an off-transition. For each detected transition, a transition entry containing the transition location is stored within a data array called a transition table. Depending upon the sense of the transition entry, the transition entry is stored within either the "ON" transition table or the "OFF" transition table. These transition entries are typically sorted by ascending order of the scan lines to support the creation of a character bitmap. Each transition having an "ON" sense is paired with its corresponding transition having an "OFF" sense and the pixels associated with the scan line are set or "filled" for the character bitmap. The character bitmap defines the pixels to be activated for supplying an image of the character on a connected display device.

Reviewing now certain aspects of the scan conversion process, one method for estimating the amount of workspace memory to support scan conversion tasks is to multiply the number of scan lines in the character bitmap times the maximum possible intersections of a character outline per scan line. The maximum possible intersections per scan line is calculated by traversing the character outline and counting the characater's local maxima and minima, which are also described as "reversals" in direction. Although this method represents a simple computational solution for the memory estimate, it supplies an overly conservative estimate of workspace memory for character outlines with small details. Accordingly, there is a need for an improved method that defines a more efficient use of memory to support scan conversion tasks. The present invention provides an improved method for allocating memory workspace by accurately calculating memory requirements for character outlines with either large details or many small details, thereby supporting the efficient use of this computer resource.

The use of splines to represent outline curves is known in font technologies. One technique for rendering a spline is to break it into short line segments and then to render those segments sequentially by using a parametric equation to define the short line segments. However, the use of a parametric equation to render a spline supplies only an approximate representation of the actual curve. In addition, to obtain a reasonably accurate approximation, a large number of line segments must be used to represent the character outline. This increases the number of calculations, thereby increasing the time required to render the spline. Accordingly, there is a need in the art for a method of rendering splines that is both faster and more accurate than the above-described conventional technique. The present invention implements an implicit rendering algorithm based on a second order equation for a parabola to achieve improvements in speed and character image quality.

In general, rendering a bounded character outline or shape produces for a given scan line both an on-transition and an off-transition based upon the entering and exiting intersections of the scan line with the character outline. However, the concept that a bounded shape intersects a given scan line in matched pairs of transitions breaks down when the scan line contacts extrema of the shape, or when an endpoint of the shape is coincident with scan lines. The present invention addresses the special case of rendering an endpoint on a scan line by supplying a structured approach that examines all geometric possibilities for approaching and exiting the endpoint to determine whether the pixel associated with the endpoint should be activated.

As pixel-oriented display devices have achieved higher resolution characteristics, it has become possible to display text in smaller-sized characters on these devices while still maintaining readability. However, as physical character size becomes smaller for a display device of a given resolution, sampling error distortion can occur. Accordingly, after making an initial determination for which pixels to turn on, the contour of the character outline is analyzed to detect one type of sampling error that commonly occurs when displaying characters of a given font on a pixel-oriented display device, an error called "dropout." A dropout condition may be defined as an interior region of a character outline that passes through a scan line and between adjacent pixels in which neither pixel has been turned on in accordance with the previously described Rules 1 and 2. In other words, a dropout condition occurs when the space within the character outlines become so narrow that this contour portion misses one or more pixel centers.

If a dropout control technique is not used to correct the dropout condition, the decision-making algorithm for activating a pixel may determine that a particular pixel should not be activated, thereby causing a break at a point in a character that the viewer would expect to be a continuous line. Although this problem will naturally arise even if the physical size of the character to be displayed is rather large (if the resolution of the display device is low, or if the character features are very thin), it is mostly problematic when characters are to be displayed with a small physical size.

It is known that the subjective response of a reader to dropout is to prefer having a pixel illuminated, even if it tends to geometrically distort the character, over a situation in which an inappropriate discontinuity occurs in the strokes of the character. Therefore, the art has addressed the subject of dropout control so that the results in a displayed image is most pleasing to viewers. A conventional technique for addressing the dropout problem is to always activate the pixel on the left for a horizontal pair of pixels and, for a vertical pair of pixels, to always activate the pixel below.

From a typographical view, this convention produces a less than desirable result. Another technique is to always illuminate the pixel located nearest the contour of the character outline. This generally provides a displayed image having an appearance preferred by viewers because it preserves the symmetry of the character outline. However, this approach requires knowledge and storage of intersections of the character outline with the scan lines, or transitions, in sub-pixel precision, thereby increasing the processing time and memory requirements for scan conversion. The present invention provides an improved solution for the dropout condition by reducing the number of calculations required to obtain sub-pixel accuracy for the rendering of line segments and splines.

In summary, the present invention provides an improved scan converter to support the efficient and accurate display of character outlines by pixel-oriented display devices. To conserve the finite resource of memory, the present invention supports an efficient use of available memory workspace by accurately determining an upper bound for the amount of memory required to support scan conversion calculations. To achieve improvements in speed and character image quality, the present invention renders the spline segments of a character outline by using a quadratic equation to calculate an implicit function based on the spline control points. The present invention further addresses in a systematic manner the rendering of an endpoint located on a scan line to determine whether the pixel associated with the endpoint should be activated. This decision is based upon the direction of approach to and exit from this endpoint for the pair of segments connected to the endpoint. The present invention also reduces the number of calculations requiring sub-pixel precision to support the selection of the pixel located nearest the contour, thereby providing an improved solution for dropout condition.

SUMMARY OF THE INVENTION

The present invention fulfills the above-described needs by providing an improved scan converter for efficiently and accurately generating character bitmaps that designate pixels to be activated for displaying character images on pixel-oriented display devices.

The rendering of a glyph uses a portion of computer memory as "workspace" memory for the storage of rendering calculations and data results. A prior method for estimating the maximum amount of memory required to support these scan conversion operations is completed by multiplying the; number of scan lines in the character bitmap times the maximum possible intersections of a character outline per scan line. However, for the rendering of characters having numerous contour reversals that occur over a small set of the total scan lines, this method typically produces an overly conservative estimate for the amount of required workspace memory.

Thus, the first aspect of the present invention provides a method for calculating a more accurate estimate of the maximum amount of workspace memory, thereby avoiding the inefficient use of the finite resource of computer memory. By traversing the boundary of a character outline or glyph, each local maximum or local minimum of the glyph can be detected and the sense for each of these reversals can be determined. A local maximum represents a contour reversal having a positive reversal sense and a local minimum represents a contour reversal having a negative reversal sense. The location of each detected local minimum and local maximum is defined in terms of the scan line number for the scan line associated with one or more of these reversals. It will be appreciated that local maxima and minima of a function can be located at points where the partial derivatives for the function are zero.

Upon detecting the location and the sense of each of the reversals for the glyph, a first sum is calculated for the scan line numbers associated with local minima, and a second sum is calculated for the scan line numbers associated with local maxima. The difference between the first and second sums is proportional to the required workspace memory allocation. Computer memory is allocated in proportion to this estimate of the maximum amount of required workspace memory.

For another aspect of the present invention, an improved method for rendering a spline is provided to support the scan conversion of a glyph. For a selected spline, each occurrence of an intersection of a scan line and the spline is defined by a non-parametric equation. Each intersection defines a transition and a corresponding transition sense of either a positive ("ON") sense or a negative ("OFF") sense. The transition sense of each transition is determined by the location of the spline within the pixel grid, i.e., by the particular quadrant that the spline is located. Forward differencing is used to solve the non-parametric equation and to determine the location in pixel coordinates for each transition. This forward differencing technique supports a "walk" along the contour of the spline to detect the transition (s). For each detected transition, a transition entry is placed in an appropriate transition table to support the subsequent filling of the character outline. Each transition entry can include the location of the transition in pixel-based coordinates and is stored in either of two types of storage arrays, an "on" transition table or an "off" transition table, based upon the sense of the transition.

The improved spline rendering method uses a second order, non-parametric equation that models a parabola. This improved method reduces the number of calculations required for rendering a particular spline because prior rendering methods typically have used a third order, parametric equation to render an outline curve. Unlike these prior spline rendering methods, the improved method does not rely upon the iterative adjustment of the time parameter (t) to determine the intersections of the spline with a scan line. Instead, the improved method relies upon the calculation of coefficients based upon spline control points and an equation solution defined by the iterative adjustment of pixel coordinates. Thus, it will be appreciated that this implicit rendering algorithm of the present invention achieves performance improvements in speed and character image quality.

Focusing upon the details of the improved method for rendering a spline (and assuming that the option of dropout control is not selected), the spline is first divided as required into discrete representations of spline segments. One of the spline segments is selected and the location of the segment within the pixel grid is determined. If the selected segment is located in either the first or the second quadrants, then the "ON" horizontal transition table is selected for storing the locations of horizontal transitions. These horizontal transitions are preferably stored by the corresponding horizontal scan line number in this transition table. In contrast, if the selected segment is located in the third or fourth quadrants, the horizontal transitions detected by this spline rendering method are stored in the "OFF" horizontal transition table.

If required, the selected segment is normalized by reflecting it within the first quadrant of the pixel grid. A nonparametric equation is then generated to describe the selected spline segment. This non-parametric equation is solved using an initial set of pixel coordinates (x, y) to produce a sum Q. The relationship of the sum Q to the value zero determines whether the point defined by the pixel coordinates is located outside, inside, or on the selected spline segment. In particular, if the sum Q is greater than zero, the point is outside the selected spline segment and, if the sum Q is less than zero, the point is inside the selected spline segment. The point represented by pixel coordinates is located on the selected spline segment if the sum Q is equal to zero.

In view of this relationship of the sum Q to the value zero, the value of the sum Q is tested to determine if it is greater than zero. If the sum Q is greater than zero, then an integer pixel unit is added to the "x" pixel coordinate value to generate a new set of the pixel coordinates. The non-parametric equation is then solved again using this new set of pixel coordinates to produce a new value of the sum Q, and the loop continues. In contrast, if the sum Q is less than or equal to zero, then this set of pixel coordinates is stored in the appropriate horizontal transition table to define a horizontal transition. This process, which is commonly described as forward differencing, is repeated on a pixel-by-pixel basis by "walking" the selected spline segment. Each step for which the sum Q is less than zero represents an intersection of the selected spline segment with a horizontal scan line at the location defined by the associated pixel coordinates.

The forward differencing process is repeated to complete the rendering of the selected segment and, in this manner, each segment of the spline is rendered.

For another aspect of the present invention, an improved method is provided for rendering a glyph having an endpoint located on a scan line. This improvement is intended for use with the type of scan conversion process that (1)i detects each occurrence of an intersection of a scan line and a segment and (2) places the corresponding transition entry into a transition table in response thereto. First, an occurrence of an intersection of a centerpoint and a scan line is detected. A first segment representation and a second segment representation are connected at the centerpoint, which defines an endpoint for each of the first and second segment representations. An approach direction to the intersection for a first endpoint of the first segment representation and an exit direction from the intersection for a second endpoint of the second segment representation are then determined based upon the pixel coordinates for the corresponding adjacent endpoints.

A table is provided that defines transition sense entries for each combination of the values of the approach direction and the exit direction. Using the table, a particular transition sense entry associated with the values of the approach direction and the exit direction is located. This transition sense entry is useful for creating a transition entry for the centerpoint in a transition table. A transition sense entry may indicate zero, one, or two transition entries to be added to the transition tables. It will be appreciated that this table defines the transition sense entries for all possible approach and exit directions, thereby supporting an organized determination of the transition sense associated with the endpoint on the scan line.

For yet another aspect of the present invention, an improved method for controlling a dropout condition is provided for a scan conversion operation of the type that (1) detects each occurrence of an intersection of a scan line and a spline or a line segment, or an endpoint of one of these discrete segments, and (2) places a transition entry in the appropriate transition table in response thereto. This scan conversion process detects, a potential dropout condition in response to a pair of transition entries having opposite transition sense values at the same location in the pixel grid. These transition entries are generated by first and second discrete segments crossing a particular scan line and extending between adjacent pixels to define a region that does not include a pixel center. The improved dropout control process determines, in sub-pixel coordinates, first and second scan-direction coordinates for respective intersections of the first and second discrete segments and the particular scan line. In particular, simultaneous linear equations for line segments and recursive subdivision for splines are used to recalculate with sub-pixel accuracy the locations of scan line intersections for the pair of adjacent pixels associated with the dropout condition. If the scan coordinates represent an endpoint of a contour segment on a scan line, then these pixel coordinates are used to define the scan line intersection. A pixel having the pixel center closest to a midpoint between the first and second scan-direction coordinates is determined and this pixel is subsequently activated. By reducing the number of time-intensive sub-pixel calculations, the present invention supplies improved dropout control performance.

Therefore, it is an object of the present invention to provide an improved method to efficiently use available memory by accurately determining an upper bound for the amount of workspace memory required to support scan conversion calculations.

It is a further object of the present invention to achieve improvements in speed and accuracy for the rendering of splines.

It is a further object of the present invention to provide an improved method for rendering spline segments of a character outline by using a second order non-parametric equation to calculate an implicit function based on the spline control points.

It is a further object of the present invention to provide an improved method for rendering an endpoint located on a scan line by determining whether the pixel associated with the endpoint should be activated based upon the direction of approach to and exit from the endpoint for the pair of segments connected to the endpoint.

It is a further object of the present invention to provide an improved method for controlling dropout conditions that reduces the number of calculations requiring sub-pixel precision to support the selection of the pixel having a pixel center located nearest the contour.

That the present invention achieves these objects and fulfills the needs described hereinabove will be appreciated from the detailed description to follow and the appended drawings.

BRIEF DESCRIPTION OF THE DRAWINGS

FIG. 4 is a logical flow diagram of a scan conversion process for a pixel-oriented display device.

FIG. 5 is a logical flow diagram illustrating a method for calculating an upper bound for workspace memory to support the storage of scan conversion calculation results.

FIGS. 13A and 13B respectively represent a character outline having pixels activated prior to the application of dropout control, and the same character outline having pixels activated after the application of dropout control.

FIGS. 14A and 14B are logical flow diagrams that illustrate the preferred method for controlling a dropout condition.

DETAILED DESCRIPTION

Figure 1:
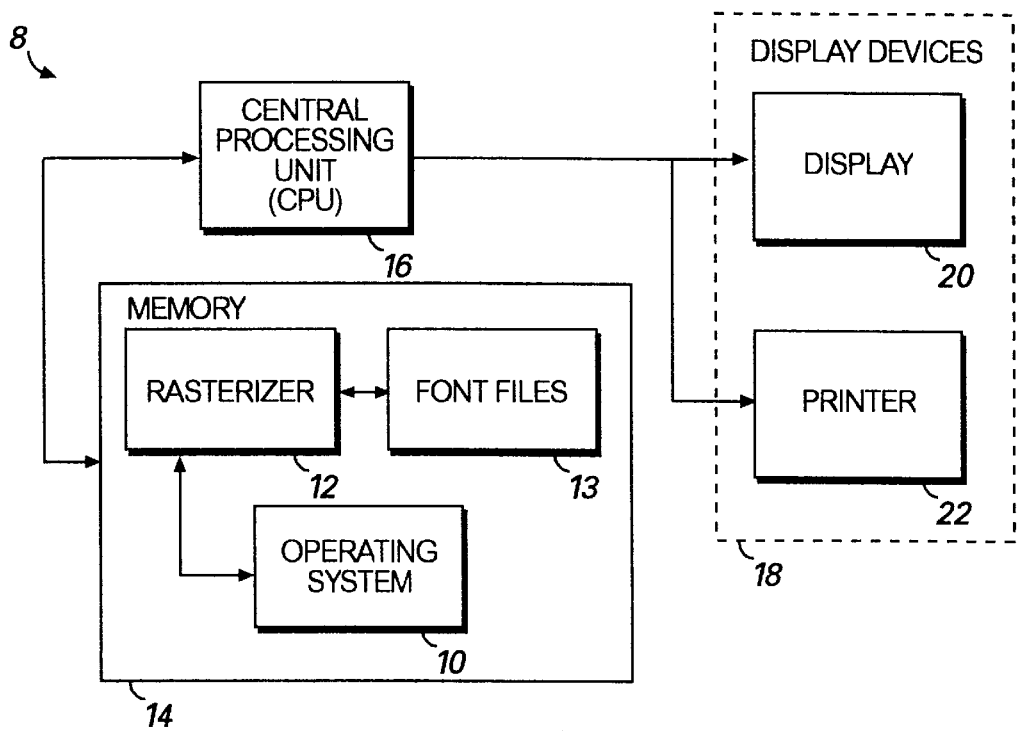
FIG. 1 is a high-level block diagram of a computer system in which the preferred embodiment of the present invention is operative.

The present invention is directed to an improved scan converter to support the efficient and accurate display of character outlines by pixel-oriented display devices. The present invention achieves improvements in operational speed, in memory usage, and in character image quality over known scan converters. These improvements address various aspects of the scan conversion process, including workspace memory allocation, spline rendering, endpoint handling, and dropout control.

Turning first to the nomenclature of the specification, the detailed description which follows is represented largely in terms of algorithms and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures supplied by one or more the memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, an "algorithm" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

In addition, it should be understood that the programs, algorithms, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the following description, it is well known to those skilled in the art that pixel-oriented display devices include both active light-generating devices, such as CRT displays, and light-absorbing or blocking devices, such as back-lit LCD displays, dot matrix printers, and laser printing devices. These pixel-oriented display devices will be collectively described as display devices or output devices in this specification.

Those skilled in the art will appreciate that a character outline is filled by turning on or turning off the appropriate pixels of the display device as defined by the bitmap for that character outline. For this specification, a pixel is turned on or activated when it is illuminated or rendered black and is turned off when it is not illuminated or is rendered white.

The present invention was designed to work in the environment of, and as a part of, an image processor or rasterizer for handling TRUETYPE font descriptions. Nevertheless, the applications for the present invention are not so limited. TRUETYPE font descriptions are defined within the "WINDOWS" operating system marketed by Microsoft Corporation, Redmond, Wash., the assignee for the present invention. This specification makes reference to conventions for TRUETYPE font descriptions and processes for converting same that are known to those skilled in the art. However, the generic nature of this specific type of font descriptions will be recognized by those skilled in the art and the application of the improved scan converter with other descriptive formats will be apparent.

With that preface, the present invention will now be described with references to the drawing figures. FIG. 1 shows a block diagram of the preferred operating environment, a computer system, for the preferred embodiment of the present invention. The present invention is based upon computer-implemented processes that can be embodied in one or more programs for a data processing system, such as a computer system, to carry out the methods and functions described herein. This computer-implemented process operates upon electrical or other physical signals to generate the desired physical results, namely the illumination of physical pixels for a pixel-oriented display device.

Turning now to FIG. 1, a computer system 8 runs an operating system 10 associated with a rasterizer 12 and font files 13. The operating system 10, the rasterizer 12, and the font files 13 can be stored within a memory 14 and operate with a central processing unit (CPU) 16 to support the display of text-based characters by one or more of the connected display devices 18. As requested by the operating system 10 or an application program (not shown) running on the computer system 8, the rasterizer 12 reads the font description supplied by the desired font file 13 and generates bitmaps of the character outlines. These character bitmaps define the pixels to be activated for displaying the images of characters on the selected display device. The rasterizer will be described in more detail below with respect to FIG. 2.

Each font file 13 contains a description of the geometric characteristics of the characters within a character set associated with a selected font. This description is a definition of points expressed in font units ("FUnits") located within a square referred to as the em square. The number of FUnits per square is selectable by the font designer, within a predetermined range. The number of FUnits per em square is thus an expression of the resolution of the font design selected by the designer. Accordingly, as the FUnits per em square increases, the ability of the font designer to describe finer detail or better defined curvilinear strokes of a glyph or character outline increases. The font files 13 are preferably compatible with TRUETYPE font technology.

The memory 14, which is connected to the CPU 16 via a bidirectional signal path, may be implemented as a volatile memory storage device, such as random access memory (RAM), or nonvolatile memory storage device, such as a fixed disk, read only memory (ROM), or a flexible disk, or a combination of both memory components. For example, the operating system for a general purpose computer system is typically stored within nonvolatile memory and, upon boot, the operating system is allocated a portion of volatile memory to directly support computer operations. Thus, the operating system 10, as well as the rasterizer 12 and the font files 13 can be stored in a permanent manner within nonvolatile memory. Subsequent to booting the operating system 10, the rasterizer 12 and one or more of the required font files 13 can be copied to the temporary memory mechanism of volatile memory.

Although the disclosed embodiment shows the rasterizer 12 and the font files 13 stored within a memory storage device that is directly accessible by the CPU 16, it will be appreciated that the rasterizer 12 and the font files 13 also can be stored within a memory storage device associated with one of the devices 18.

The CPU 16 is typically implemented as a microprocessor, such as the models 80386 or 80486 that are available from Intel Corporation, Santa Clara, Calif. The CPU 16 operates in combination with computer software, such as the operating system 10 and application programs, to control the operations of the computer system 8. To simplify the representation of the known architecture of a general purpose computer system, conventional computer components, including computer resources such as a direct memory access controller, an interrupt controller, and input/output (I/O) controllers, as well as video and printer adapter devices, are not shown. However, it will be appreciated that the CPU 16 is connected to and supported by conventional computer components via one or more system busses that support communications of control, address, and data signals between the CPU 16 and these standard computer components.

For the preferred embodiment, an application program runs on the CPU 16 under the "WINDOWS" operating system. When this application program needs to display or print characters in a particular font, it issues a display image request to the operating system 10 for operation by the combination of the rasterizer 12 and the font files 13. Specifically, when a client application or application program makes a request for a particular font, appropriate parameters for the geometric description of characters are obtained from the font files 13 and converted for use by the rasterizer 12. The rasterizer 12 subsequently performs a scan conversion on the geometric description for each scaled character outline to support the construction of character bitmaps. A character bitmap is constructed for each obtained character to define the physical pixels to be activated or turned on for displaying the image of the character on one of the connected display devices 18.

The display devices 18 include a display 20 and a printer 22, which represent typical pixel-oriented display devices. The display 20 can be implemented as a CRT display or an LCD display and the printer 22 can be implemented as a dot matrix printer or a laser printer. Those skilled in the art will appreciate that the display 20 and the printer 22 are two examples of pixel-oriented display devices and that other such devices may be used with an embodiment of the present invention.

Although the disclosed embodiment shows the rasterizer 12 and the font files 13 as part of an operating system 10 running on a CPU 16, it will be appreciated that the display devices 18 can include "smart" output devices having a microprocessor and memory for supporting the operations conducted by the rasterizer 12. Accordingly, other embodiments of the present invention include the rasterizer 12 and the font files 13 as a portion of either a display controller for the display 20 or a printer controller for the printer 22. Specifically, the rasterizer 12 and the font files 13 can be incorporated within the display controller or the printer controller to support pixel-oriented display functions.

Figure 2:
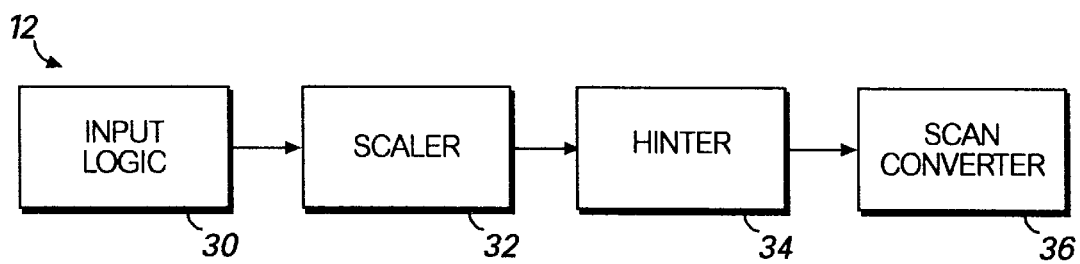
FIG. 2 is a block diagram that illustrates the preferred embodiment of the present invention.

FIG. 2 is a high level diagram that illustrates the components of the rasterizer 12. Referring now to FIGS. 1 and 2, to support the generation of character bitmaps for the display devices 18, the rasterizer 12 includes input logic 30, a scaler 32, a hinter 34, and a scan converter 36. When an application program (not shown) requests use of a selected font for display, the input logic 30 accepts the corresponding selected file from the font files 13 maintained by the memory 14. The input logic 30 thereafter reads the geometric description of the character outline or glyph from the selected font file. In addition, the input logic 30 receives information to support the scaling of the character outline, including the point size of the character to be displayed and the predetermined pixel size or resolution of the selected display device 18. Both pieces of this scaling information can be supplied to the input logic 30 by either the requesting application program or the operating system 10.

The input logic 30 supplies the description of the character outline, the specified point size, and the pixel size for the selected display device 18 to the scaling logic 32. In response, the scaling logic 32 scales the geometric description of the character outline to generate a scaled description in physical pixel coordinates. This maps the geometric description from the FUnits of the em square into physical pixels for the selected display device 18. Accordingly, the character outline is scaled as a function of the predetermined physical pixel size of the physical size (height in points) of the character to be displayed and the resolution in pixels per inch on the display device 18 upon which the character is to be displayed.

Upon completing the scaling operation, the scaling logic 32 outputs the scaled character outline to the hinter 34. The hinter 34 can execute a set of routines that adjust the shape of the scaled character outline for the requested point size and resolution to fit the appropriate boundaries of the pixel grid. The hinting routines or instructions, provided by the font designer, can be stored in the font file 13 for access by the hinter 34. This form of hinting, which is commonly described as "grid fitting," operates to distort the boundaries of the character outline so that they lie on integral pixel grid coordinates. This insures that the original design proportions of the character outline are maintained even at low display resolutions and/or small font sizes. Accordingly, the hinter 34 outputs to the scan converter 36 a character outline that has been scaled for the character size and device resolution and adjusted to the appropriate boundaries of the pixel grid.

In response, the scan converter 36 produces a character bitmap and "fills" the supplied character, outline by defining the pixels requiring illumination to display the image of the character outline on the selected display device 18. According to the conventions set forth by the Technical Specification, Revision 1.5, January 1994, entitled "TRUETYPE 1.0 Font Files," by Microsoft Corporation of Redmond. Wash., the preferred scan converter 36 generates a character bitmap comprising pixels which are illuminated or turned on whenever their centers are inside or exactly on the character outline. The general structure and operations of the scan converter 36 are described in more detail below with respect to FIG. 4.

Figure 3A:
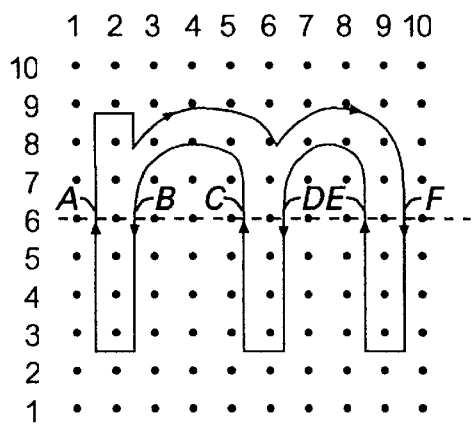
FIG. 3A is a representation of a geometric descriptor of a lower case character "m" that is superimposed on a pixel grid.

FIG. 3A illustrates a character outline for a lower case "m" superimposed on the background of a pixel grid. Referring to FIGS. 2 and 3A, the outline of the character "m," which has been scaled by the scaler 32 and hinted, if required, by the hinter 34, is supplied to the scan converter 36 to support the generation of a character bitmap. The character is outlined in a pixel grid formed by an array having ten rows by ten columns of pixels that are numbered by rows 1–10 and columns 1–10. This convention of numbering rows and columns for a pixel grid is retained consistently throughout this specification. References to the pixel grid of FIG. 3A (and FIGS. 3B, 6, 9, 10, and 13A–B) refers to pixels by an ordered (column (x), row (y)) pair of pixel coordinates and defines the locations of pixel centers. Each point or dot within a pixel represents the pixel center. Thus, the pixel in the upper most left hand corner is designated as a pixel having a pixel center at the coordinates (1, 10) and the pixel in the top right hand corner is designated as a pixel having a pixel center at the coordinates (10, 10). To simplify the drawing, the scan lines connecting the pixel centers in both the vertical and horizontal directions are not shown. Nevertheless, it will be appreciated that each row and each column of pixels includes a scan line.

Arrowheads appear at several places in FIG. 3A and show the direction of progression of points for this description of the character outline for "m." This follows the TRUETYPE convention, which specifies that the series of on-boundary points and off-boundary points are numbered sequentially so that tracing a path through the points always leaves the filled or activated area of the character outline to the right of direction of travel along the boundary.

Figure 8A:
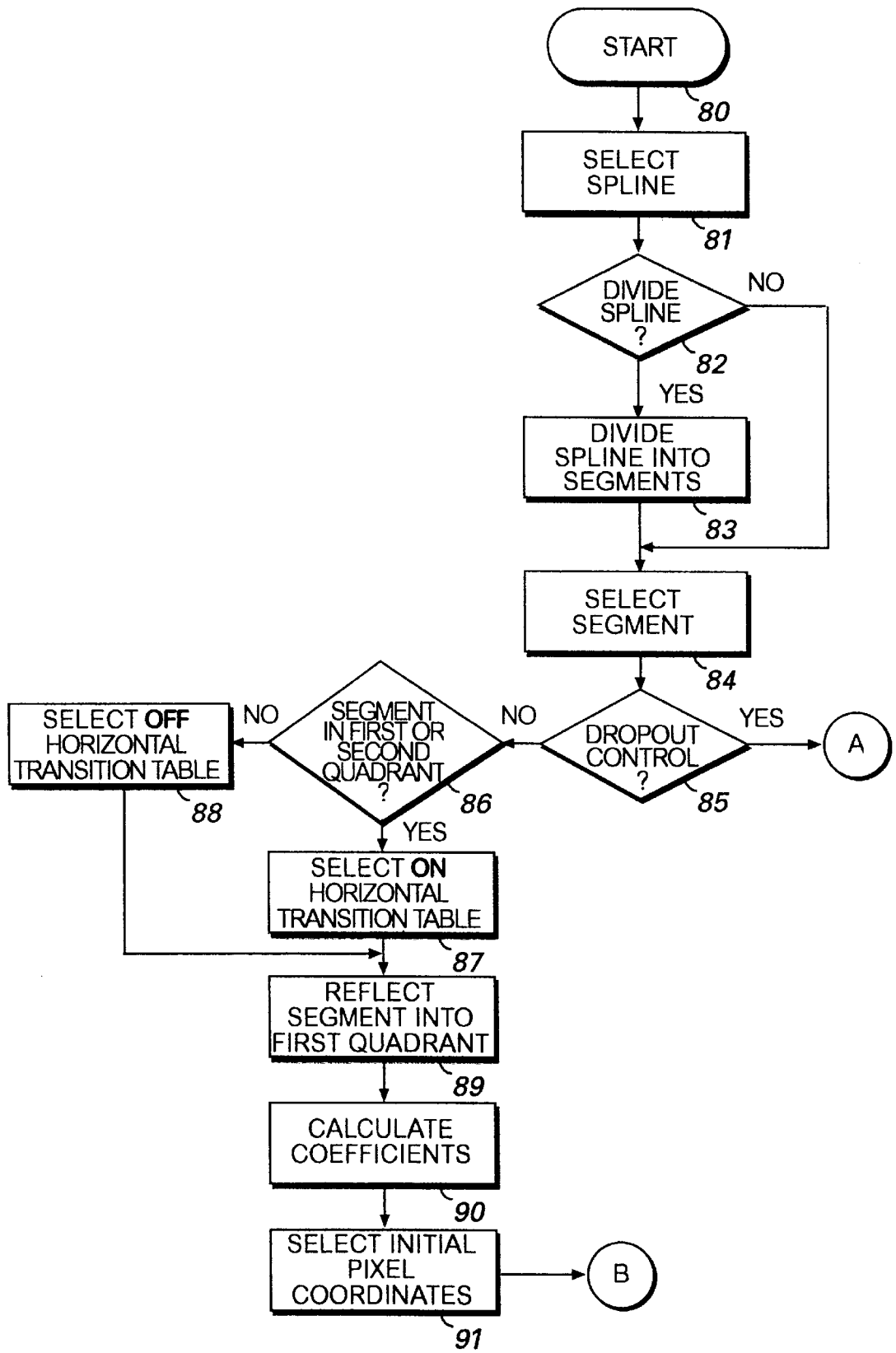
FIGS. 8A, 8B, 8C, and 8D are logical flow diagrams illustrating the preferred method for rendering the spline segments of a character outline.
Figure 8B:
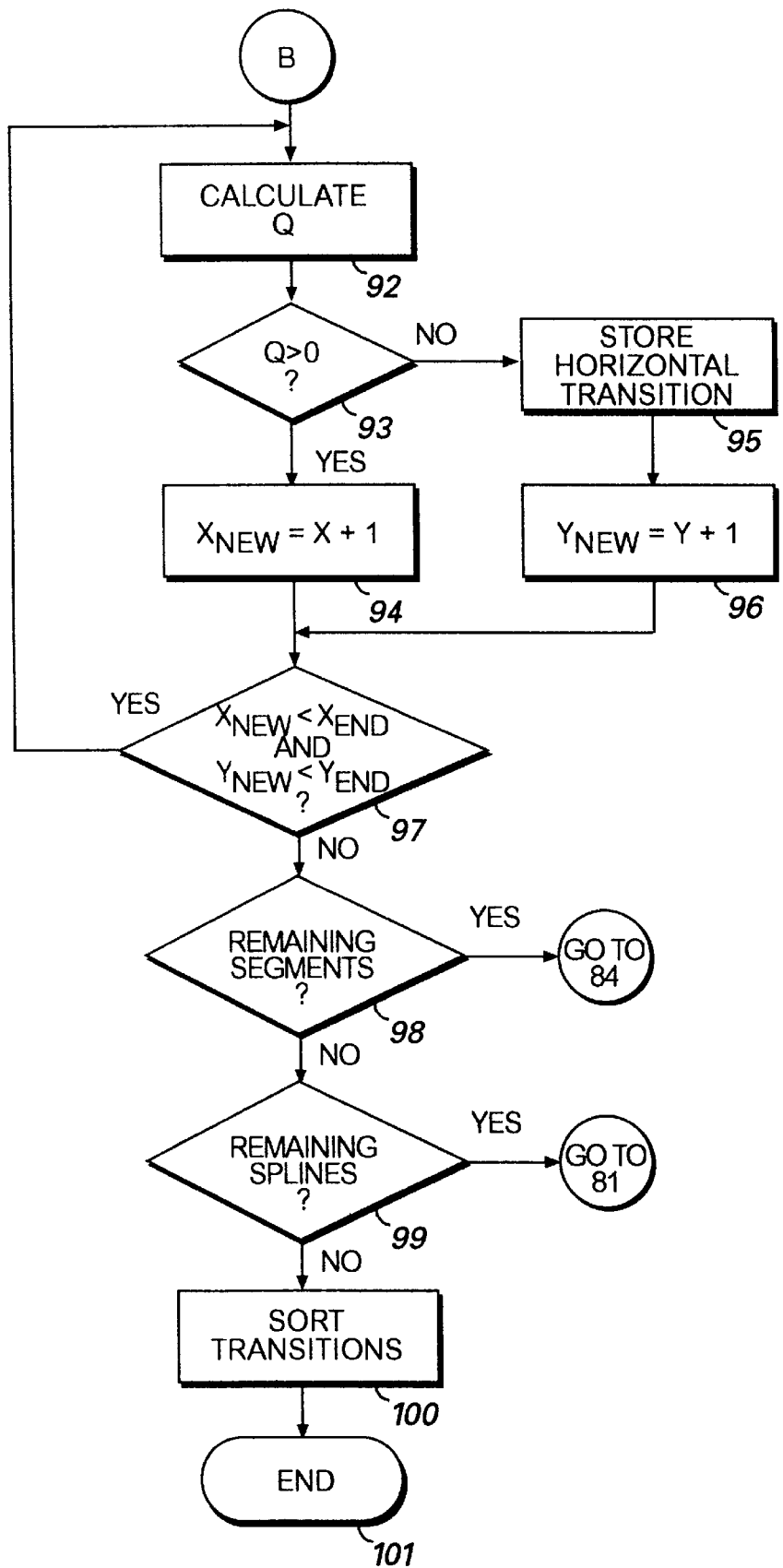
Figure 8C:
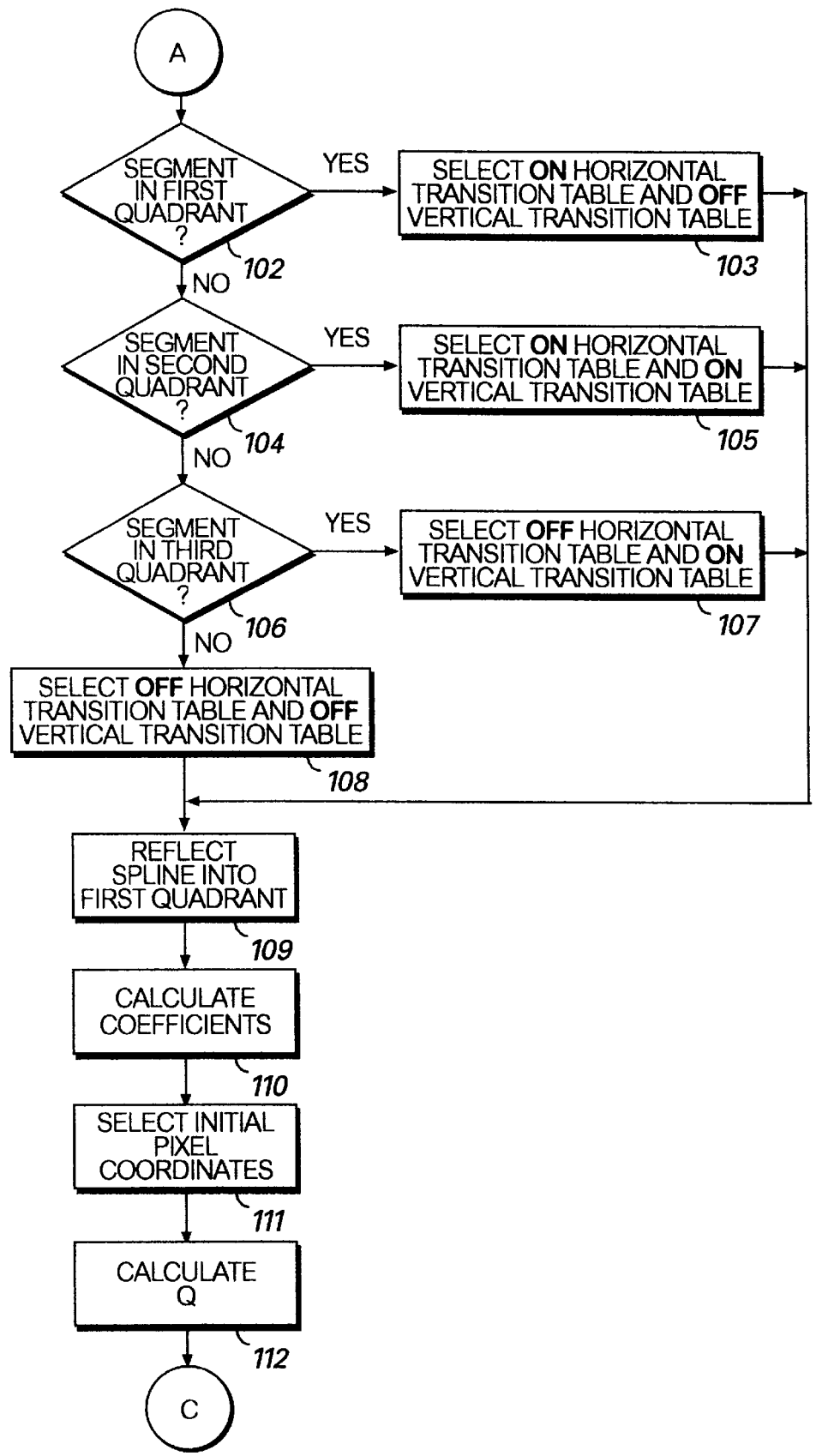
Figure 8D:
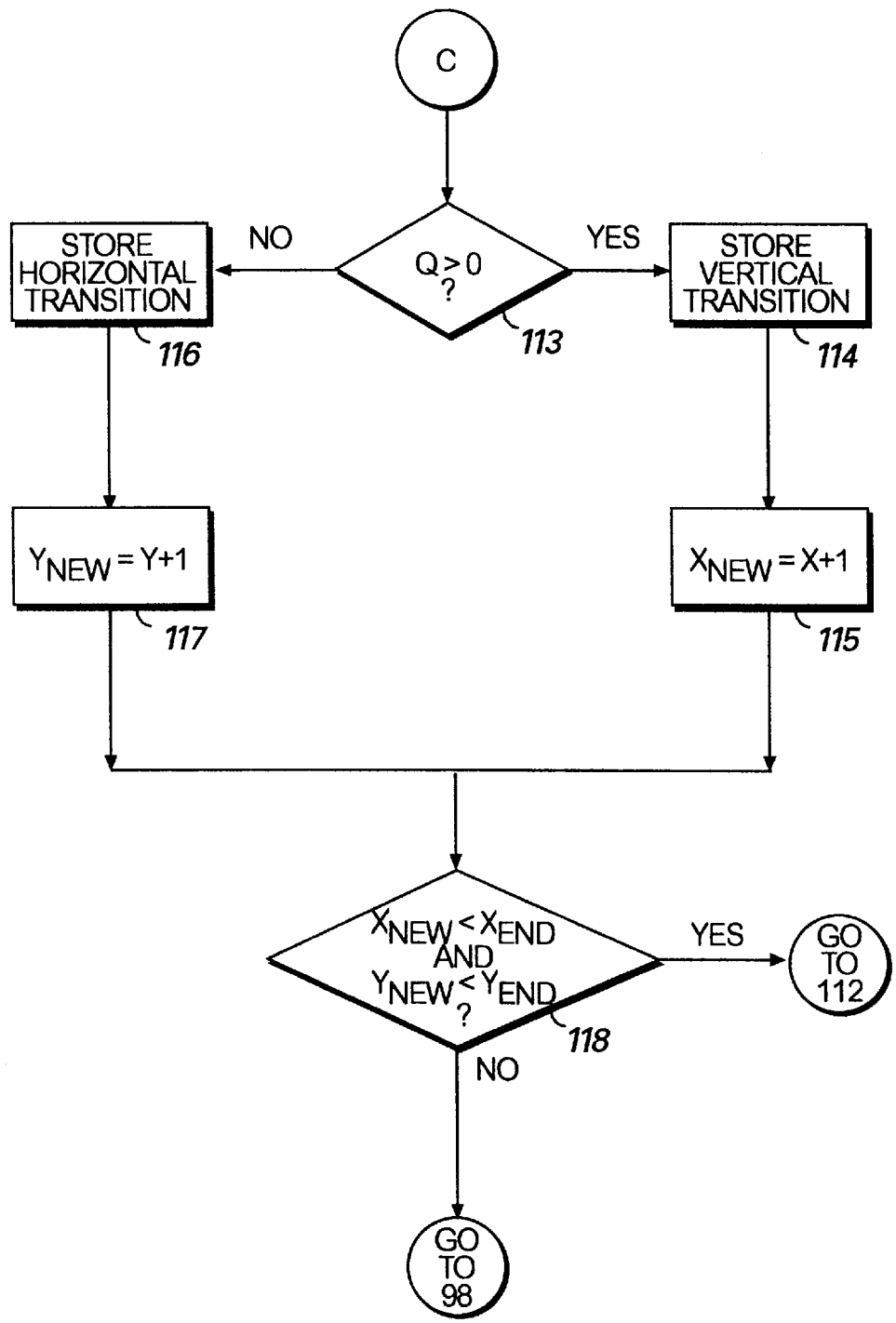

During the rendering process, the intersections of scan lines with the segments forming the character outline are examined and placed within a data structure, such as an array within the memory 14 (FIG. 1), to support the subsequent filling operation. For example, the horizontal scan line formed by connecting the pixel centers along pixel row 6 intersects the segments forming the character "m" at six distinct locations as shown by the references A–F. Each intersection represents a transition having a transition sense. For example, the intersection at A has a transition sense of "ON" because the horizontal scan line intersects this portion of the character by traveling from outside the boundary to inside the boundary. In contrast, the intersection at B represents a transition having an "OFF" transition sense because the scan line intersects this portion of the segment by traveling from inside the boundary to outside the boundary. During the rendering process, each combination of a transition location and a transition sense forms a transition entry that is stored within a transition table. The preferred rendering process for spline segments will be described with respect to FIGS. 8A and 8B.

Figure 3B:
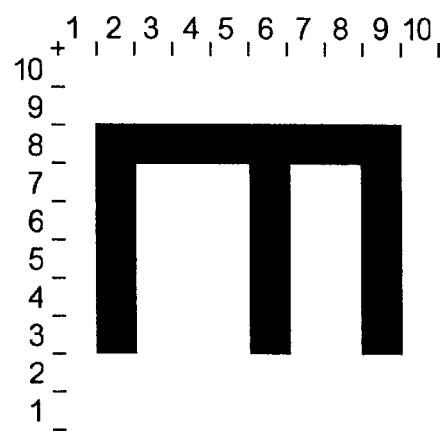
FIG. 3B is a representation of the activated or illuminated pixel result of a scan conversion of the lower case character "m" of FIG. 3A.

FIG. 3B represents a "filled" outline for the "m" character of FIG. 3A as displayed by a pixel-oriented display device. Referring to FIGS. 1, 2 and 3A and B, the scan converter 36 generates a character bitmap for the "m" character that designates the pixels to be activated for displaying the image of the character "m" on a display device, such as the display 20 or the printer 22. This type of character bitmap is used by the display device 18 to display the image as defined by the designated pixels. Each discrete "darkened" block represents a single pixel that has been activated. Following the conventional "centerpoint" fill rules, a particular pixel should be activated if the pixel center falls within the character outline or falls exactly on a character outline. Accordingly, the pixels located to the right of direction of travel along the contour of the character "m" in FIG. 3A are filled or activated to support the display of this image. Specifically, all of the pixels in column 2, column 6, and column 9 will be turned on between rows 3 and 8 and all pixels within row 8 between columns 3 and 8 are turned on or activated.

The reader is now directed to FIG. 4, in which the basic method of the scan conversion process is illustrated by a logical flow diagram. The scan conversion procedure begins in step 40 in response to receiving a character outline that has been scaled for character size and device resolution and, as required, hinted to adjust the scaled character outline to the pixel grid. This scaled character outline is measured in step 42 to determine the maximum and minimum coordinate values of this character outline. These coordinate values are preferably defined by the maximum and minimum values for the character outline as superimposed on the boundaries of the pixel grid. For example, for the character outline of the "m" shown in FIG. 3A, the maximum "x" coordinate value is 9, the maximum "y" coordinate value is 8, the minimum "x" coordinate value is 2, and the minimum "y" coordinate value is 3. The maximum and minimum coordinate values are typically determined by traversing the contours of the character outline on a point-by-point basis. The traversal of the character outline supports the construction of the bitmap bounding box and the calculation of the amount of workspace memory that will be needed to perform the remaining steps of the scan conversion process.

In step 44, the character outline is rendered by generating a pair of transition tables containing transition entries defining each occurrence of an intersection of a scan line with one of the representations of a line or spline. Each transition entry contains the transition location, i.e., the intersection of the scan line with the segment, and is stored within a transition table representing either the transition sense of an "ON" value or an "OFF" value. In other words, a transition entry having a transition sense of an "ON" value is stored in the "ON" transition table, and a transition entry having a transition sense of an "OFF" value is stored in the "OFF" transition table. Thus, the sense of each transition is implied by the table in which the transition entry is stored. These transition entries are preferably sorted by ascending order of the scan lines to support the subsequent filling operation of the scan conversion process.

Each contour of the character outline is broken into lines and splines and these segment types are rendered using separate algorithms to produce transition entries placed in the transition table. The lines of a character outline can be represented by line segments and are defined by their two endpoints. These line segments are preferably rendered by solving simultaneous linear equations, i.e., the known "integer Bresenham" algorithm, to determine the location and sense of transitions. The integer Bresenham algorithm is known and will not be described further herein.

In contrast to conventional spline rendering techniques, which typically use a forward differencing technique to solve a third-order parametric equation, the preferred spline rendering process is completed by using forward differencing to solve a quadratic equation. It will be appreciated that a quadratic equation provides a more efficient rendering calculation than a third order parametric equation because the highest term in the quadratic equation is a second order term.

A spline, which can be technically described as a second order bezier spline, is defined by three control points: two endpoints and one "off-curve" point defined by the intersection of tangents extending from the two endpoints. If the control points are defined as $(x_1, y_1)$, $(x_2, y_2)$, and $(x_3, y_3)$, then the spline rendering equation is:

$$Q = Rx^2 + Sxy + Ty^2 + Ux + Vy \qquad (1)$$

When the spline is shifted to the origin, so that $x_1=0$ and $y_1=0$, then the values of the coefficients R, S, T, U, and V are defined by the control points, as follows:

$$R = (y_3 - 2y_2)^2 \qquad (2)$$

$$S = -2(x_3 - 2x_2)(y_3 - 2y_2) \qquad (3)$$

$$T = (x_3 - 2x_2)^2 \qquad (4)$$

$$U = 4(x_2 y_3 - y_2 x_3)(y_2) \qquad (5)$$

$$V = -4(x_2 y_3 - y_2 x_3)(x_2) \qquad (6)$$

Splines which are either non-monotonic or too long for the implicit algorithm are subdivided prior to applying the algorithm. These splines are broken into segments between maximum and minimum points, thereby supplying monotonic spline segments that can be represented by a second order equation. The application of this spline rendering equation will be described in more detail below with respect to FIGS. 8A and 8B.

Although the algorithms for rendering the line segments and spline segments are different, both algorithms support the detection of the intersection of scan lines with segments to locate transitions and to determine transition senses. For character bitmap construction, this enables the selection of pixels located to the right of the associated segments as required by the convention set forth by TRUETYPE Technical Specification. The implicit spline algorithm is analogous to the integer Bresenham algorithm, but uses a second order equation of a parabola rather than the first order equation of a line.

It will be understood that the rendering process can produce transition tables containing transition entries for horizontal scan line intersections and, if required for dropout control applications, vertical scan line intersections.

Upon finishing the rendering of line and spline segments, the process proceeds to step 46 to "fill" the character outline. In step 46, each entry in the transition table for a scan line is examined and each on-transition is paired with its corresponding off-transition. In general, pixels having pixel centers located between each pair of on-transition and off-transition are set or turned on in the character bitmap. Thus, using the sorted scan line intersections, the character bitmap is traversed from top to bottom and runs of pixels are set for each horizontal scan line.

If dropout control is enabled, the entries in the transition tables are examined in step 48 to locate pixel locations where the on-transition is equal to the off-transition. This signals a dropout condition that can be resolved by setting either one of a pair of adjacent pixels. It will be appreciated that dropout control typically requires scanning in both the vertical scan line direction as well as the horizontal scan line direction. The preferred dropout control algorithm, which determines which one of a pair of adjacent pixels to turn on to resolve the dropout condition, is described in more detail with respect to FIGS. 14A and 14B. Upon completing the dropout control operation in step 48, the character bitmap now defines each of the pixels that should be activated to display the image of the character.

Figures 6, 7:
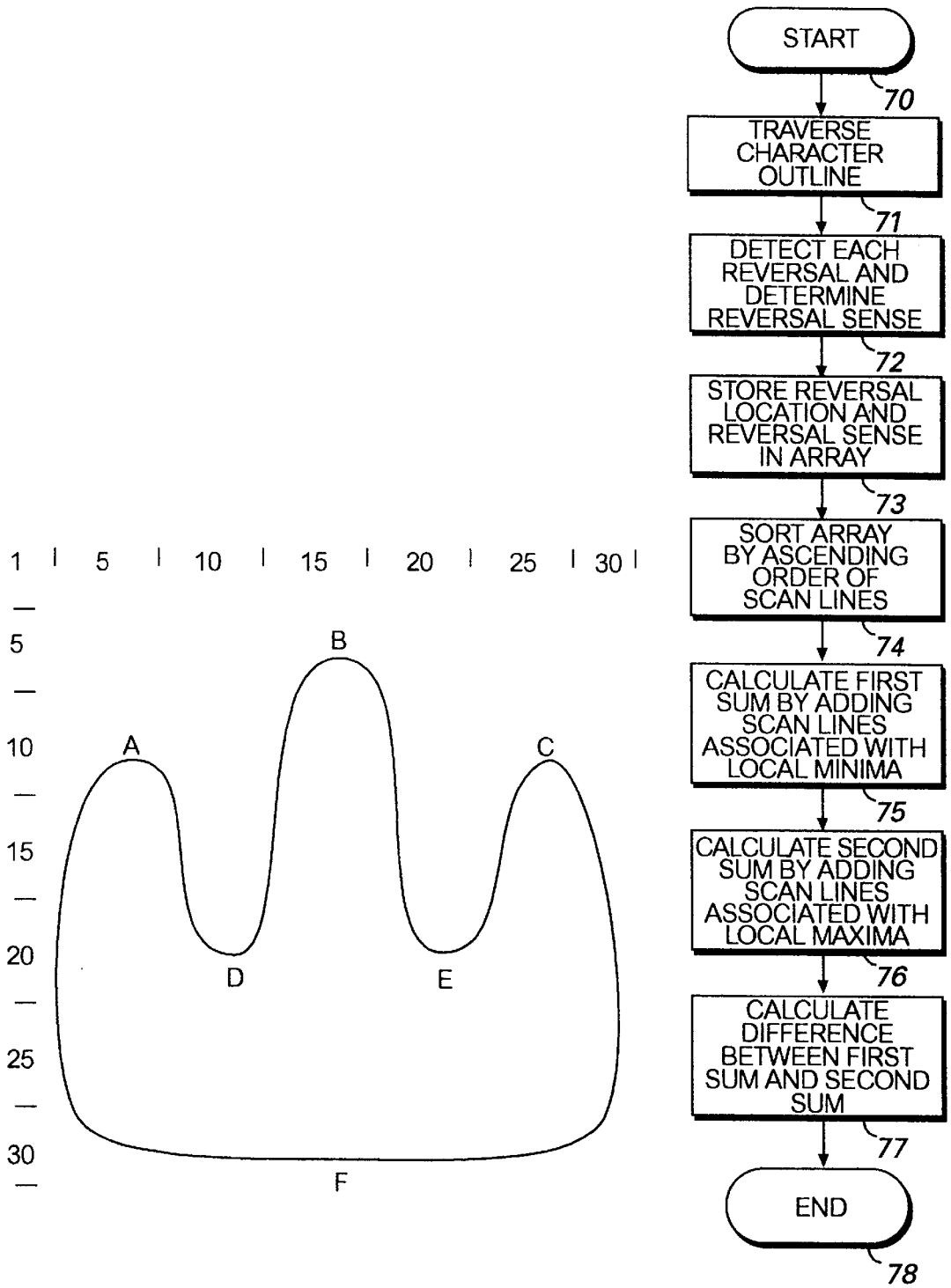
FIG. 6 is a representation of a symbol having both local maxima and minima characteristics and superimposed on a pixel grid.
FIG. 7 is a logical flow diagram illustrating the preferred method for calculating an upper bound for workspace memory to support the storage of scan conversion calculation results.

In view of the foregoing description of the steps of the scan conversion process, it will be useful to describe in more detail the various improvements for the present scan converter. FIG. 5 is a logical flow diagram that illustrates a method for calculating the workspace memory required to support scan conversion tasks. FIG. 7 is a logical flow diagram that illustrates the steps of a preferred method for calculating this workspace memory. For both methods, it will be understood that an upper bound for memory requirements is estimated prior to performing scan conversion operations to allow the operating system 10 to allocate a portion of the memory 14 for the storage of calculation results. Both methods define an improvement for the calculation of the maximum number of storage locations required for storing information associated with the rendering of a character outline. However, the preferred method illustrated in FIG. 7 further includes the advantage of computational efficiency.

Referring to FIGS. 1 and 5, the improved memory allocation method starts at step 52 and the contours of the character outline are traversed in step 54. This supports the detection of each reversal of the character outline. A reversal occurs at each local maxima or minima of the character outline in the vertical or "y" axis scan line direction. Each reversal is associated with either a positive or negative reversal sense. For example, a local maximum represents a positive reversal because the contour is traversed in an up-to-down direction. In contrast, a local minimum is associated with a negative reversal because the contour is traversed in a "down-to-up" direction. Each contour reversal indicates the beginning or the end of a pair of intersections of a horizontal scan line by the contour.

Accordingly, in step 56, each reversal and the corresponding reversal sense for the character outline are detected, and this information is stored within a data array called the reversal list in step 58. The stored record for each reversal defines the horizontal scan line at which the reversal occurs and the sense of the reversal. Each reversal indicates the beginning or the end of a pair of intersections of the scan line with a segment. Accordingly, it will be appreciated that an examination of the reversal locations supports an accurate calculation of the amount of workspace memory required to store the scan line intersection information supplied by the rendering process. The array entries are then sorted in step 60 by the ascending order of the horizontal scan lines to order the entries of the reversal list for subsequent memory estimate-related calculations. Each scan line is assigned an unique scan line number and the scan lines are preferably numbered in a proper numerical order.

In step 62, an index or index number is calculated for each horizontal scan line associated with a reversal. To calculate this index for a selected scan line, the array entries for the horizontal scan line are scanned and an index counter is updated based upon the number and sense of reversals for that scan line. Accordingly, a count of one is added to the index counter each time a positive reversal is encountered on the selected scan line. In contrast, each time a negative reversal is detected on this scan line, the index number is decremented by a count of one.

The index counter maintains a cumulative sum for the calculated index. For example, for a pair of horizontal scan lines associated with reversals, the index for the first horizontal scan line containing a positive reversal is I=1. The index for the second horizontal scan line having two positive reversals is I=3 because the count for this pair of horizontal scan lines now includes the original positive reversal and the two "new" positive reversals. In this manner, a running count is maintained by the index counter for the reversals of the character outline.

A scan line range is defined by the number of consecutive scan lines associated with a particular index number. In other words, a scan line range is associated with a particular index number and may be defined by incrementing a counter by one for each consecutive scan line until a change in the index number occurs. Accordingly, in step 63 the ordered reversal list is divided into scan line ranges based upon the calculated index numbers.

The amount of workspace memory required to support rendering calculations for the scan lines within a particular range is proportional to the scan line range multiplied by the index number associated with that range. Accordingly, in step 64, a memory range is calculated for each of the scan line ranges by multiplying the number of consecutive scan lines within a particular range by the associated index number. Workspace memory is subsequently allocated based upon the sum of memory ranges calculated in step 66 and the process terminates in step 68.

By comparison, a prior memory allocation method estimates an upper bound for workspace memory based upon the formula 2×N×M, where N represents the maximum number of reversals for the character outline and M is the total number of horizontal scan lines. This prior method assigns a relatively large number of storage locations to support the rendering of a character outline having a large number of reversals occurring over only several horizontal scan lines. However, if the remaining portion of the character outline includes a relatively few number of reversals, then this prior method defines a relatively conservative estimate for the required workspace memory.

In contrast to this prior method, the present memory allocation method calculates the maximum number of storage locations for workspace memory based upon scan line ranges. This supplies a more accurate estimate of the amount of memory required for supporting the subsequent rendering calculations. In particular, the resultant sum of memory ranges is not dominated by a memory range associated with a portion of the character outline having a large number of reversals over only several horizontal scan lines. Laboratory tests indicate that the improved scan converter can reduce workspace memory requirements by a ratio of as much as ten to one (10:1) for certain characters.

FIG. 6 represents a character outline having both positive and negative reversals and superimposed on a pixel grid. Referring to FIGS. 5 and 6, an improved memory allocation method will be illustrated by applying the steps shown in FIG. 5 to the character outline of FIG. 6. Upon starting the process in step 52, the character outline of FIG. 6 is traversed by moving in the same direction until all contours of the character outline have been traveled. By traversing the character outline, three positive traversals (local maxima) at A, B, and C and three negative reversals (local minima) at D, E, and F are detected. Specifically, a positive reversal is located at B along horizontal scan line 6 and a pair of positive reversals are located at A and C along horizontal scan line 11. Similarly, a pair of negative reversals are located at D and E along horizontal scan line 20 and a single negative reversal is located at F along horizontal scan line 30. This information is stored within a reversal list in step 58, and the entries in this array are sorted in step 60 by the ascending order of the horizontal scan lines. This produces a sorted array that is illustrated in Table 1.

TABLE 1

| Horizontal Scan Line | Reversal |
| --- | --- |
| 6 | 1 Positive Reversal |
| 11 | 2 Positive Reversals |
| 20 | 2 Negative Reversals |
| 30 | 1 Negative Reversal |

An index for each horizontal scan line of the sorted array is calculated in step 62. The calculated indexes for the character outline of FIG. 6 are shown in Table 2.

TABLE 2

| Horizontal Scan Line | Index |
| --- | --- |
| 6 | 1 |
| 11 | 3 |
| 20 | 1 |
| 30 | 0 |

As shown by the results in Table 2, the index counter is incremented by one for the single positive reversal (B) located along horizontal scan line 6 (I=1) and subsequently incremented by two for the pair of positive reversals (A and C) located along horizontal scan line 11 (I=3). The index is decremented by two for the pair of negative reversals (D and E) located along horizontal scan line 20, thereby resulting in an index I=1. Similarly, the index counter is decremented by one for the negative reversal (F) located along horizontal scan line 30 (I=0).

The scan line ranges calculated in step 63 for the character outline of FIG. 6 are shown in Table 3 under the column heading "Number of Scan Lines Within Range." The memory ranges calculated in Step 64 for the character outline of FIG. 6 are shown in Table 3 under the column heading "Memory Range."

TABLE 3

| Range | Number of Scan Lines Within Range | Index | Memory Range |
|---|---|---|---|
| 0–5 | 5 | 0 | 0 |
| 6–10 | 5 | 1 | 5 |
| 11–19 | 9 | 3 | 27 |
| 20–29 | 10 | 1 | 10 |
| 30 | 1 | 0 | 0 |

Workspace memory is allocated based upon the calculation in step 66 of a sum of the memory ranges. For the character outline shown in FIG. 6, the total sum of memory ranges is 42, which sets an accurate upper bound of the required workspace memory for supporting the rendering calculations. In contrast, the prior workspace memory allocation method based upon the formula 2×M×N defines an upper bound of 150 for the character outline shown in FIG. 6, wherein M=3, N=25. The workspace memory requirement will be supplied by the scan converter to the operating system to enable the allocation of physical memory.

The actual amount of workspace memory for storing information associated with the rendering of a character outline, i.e., a scan line intersection, is dependent upon whether the scan converter is conducting dropout control operations. If the option of dropout control is selected, then 4 bytes are used per scan line intersection; otherwise 2 bytes are used per scan line intersection. For the above-described example, 168 bytes of workspace memory is allocated if the option of dropout control function is selected and 84 bytes is allocated if this option is not selected.

Turning now to FIGS. 1 and 7, for the preferred method for allocating workspace memory, it will be seen that the first five steps of the process of FIG. 7 are identical to corresponding steps in FIG. 5 for traversing the character outline and detecting, storing, and sorting reversal data. In particular, the process starts at step 70 and the contours of the character outline are traversed in step 71. This supports the detection of each reversal of the character outline. In step 72, each reversal and the corresponding reversal sense for the character outline are detected, and this information is stored in the reversal list in step 73. The array entries are then sorted in step 74 by the ascending order of the horizontal scan lines to order the entries of the reversal list for subsequent memory estimate-related calculations.

In step 75, a first sum is calculated for the scan line numbers for the scan lines associated with local minima. A second sum is calculated in step 76 for the scan line numbers for the scan lines associated with local maxima. In step 77, the second sum is subtracted from the first sum to supply an estimate of the maximum amount of required workspace memory. The method is terminated in step 78 and computer memory is allocated in proportion to this estimate of the maximum amount of required workspace memory. This workspace memory calculation process of FIG. 7 is preferred over the process of FIG. 5 because it reduces the number of computations required to calculate the workspace memory estimate.

To illustrate an application of the workspace memory calculation process of FIG. 7, the reader is again referred to the character outline shown in FIG. 6. Referring to FIGS. 6 and 7, the completion of the steps 70–74 leads to the reversal data shown in Table 1. The summation in step 75 of the scan line numbers of all negative reversals or local minima leads to the calculation of the first sum of 70 (20+20+30=70). In similar fashion, the summation in step 76 of the scan line numbers of all positive reversals or local maxima leads to the calculation of the second sum of 28 (6+11+11=28). Workspace memory is allocated based upon the calculation in step 77 of the difference between the first and second sums, namely the calculated difference of 42. These results are summarized in Table 4.

TABLE 4

| Scan Line Number | Sense | Value | Calculation |
|---|---|---|---|
| 6 | −1 | 6 | |
| 11 | −1 | 11 | |
| 11 | −1 | 11 | Second Sum = 28 |
| 20 | +1 | 20 | |
| 20 | +1 | 20 | |
| 30 | +1 | 30 | First Sum = +70 |
| | | | Difference = 42 |

This difference sets an accurate upper bound of the required workspace memory for supporting rendering calculations. If the option of dropout control is selected, then this difference is multiplied by four bytes per scan line intersection to obtain the allocated memory range of 168 bytes; otherwise, this difference is multiplied by two bytes per scan line intersection to obtain the allocated memory range of 84 bytes. The method terminates at the END step in step 78.

FIGS. 8A, 8B, 8C, and 8D, collectively described as FIG. 8, are logical flow diagrams illustrating the preferred steps for an improved method of rendering the splines of a character outline or glyph. This spline rendering method uses the second order, non-parametric equation (1), $Q=Rx^2+Sxy+Ty^2+Ux+Vy$, wherein the coefficients R, S, T, U, and V are defined by the previously introduced equations 2–6. The relationship of the sum Q to 0 for any given point within the Cartesian plane, which for the preferred embodiment is represented by a pixel grid divided into four quadrants, determines whether the point is outside, inside, or on the spline. The application of a non-parametric equation for the representation of splines is further described in "Rasterization of Nonparametric Curves," by John D. Hobby, in *Association of Computing Machinery (ACM) Transactions on Graphics*, Vol. 9, No. 3, July 1990, pages 262–277.

Following the TRUETYPE Technical Specification, a point is outside the spline (to the left of the contour) if Q is greater than zero; inside the spline (to the right of the contour) if Q is less than zero; and located on the spline if Q equals zero. By starting at an initial set of pixel coordinates and assuming that the spline is a monotonically ascending curve, the intersections of scan lines with the segments forming the character outline in pixel coordinates are detected by "walking" up the spline in a stair-step fashion.

Referring to FIGS. 8A, 8B, 8C, and 8D, the improved rendering method starts at step 80 and a spline of a character outline is selected in step 81. In step 82, an inquiry is conducted to determine if the selected spline should be subdivided into separate monotonic segments. If so, the method proceeds to step 83 by following the "YES" branch. Otherwise, the "NO" branch is followed to step 84. In step 83, the spline is subdivided into separate monotonic segments. This subdivision of the spline is typically completed by dividing the spline at each detected local maximum or minimum. One of the segments is then selected in step 84 for rendering.

In step 85, a determination is made as to whether the option of dropout control has been selected for the scan conversion process. The decision to this inquiry affects a selection of the appropriate branch of tasks for the rendering process. Specifically, if dropout control has not been selected, then the "NO" branch is followed from step 85 to step 86 and detected transitions are stored in transition tables that accept only horizontal transitions, i.e., those transitions representing the intersection of the contour with a horizontal scan line. In contrast, if dropout control is selected, then the "YES" branch is followed to step 102 via the "A" node and detected transitions are stored in either horizontal transition tables or transition tables that accept only vertical transitions, i.e., those transitions representing the intersection of the contour with a vertical scan line. It will be understood that the selection of the option of dropout control for a scan conversion process typically requires both horizontal and vertical scanning of the pixel grid.

Turning first to the rendering operation without dropout control selection, in step 86, an inquiry is conducted to determine whether the selected spline, i.e., a segment selected in step 84 or the entire spline selected in step 81, is a monotonically ascending curve located within the first or second quadrants of the pixel grid. If so, the process continues to step 87 and detected transitions for this selected segment will be stored within the "ON" horizontal transition table. If the response in step 86 is negative, then the "NO" branch is followed to step 88 and the "OFF" horizontal transition table is selected for the storage of horizontal transitions for this selected segment. In either event, the transitions are preferably stored within these storage arrays by reference to the corresponding scan line number.

The selected spline is then normalized as required in step 89 by reflecting the selected segment into the first quadrant of the pixel grid.

Using control points for the selected spline segment, the coefficients R, S, T, U, and V for the equation (1) are calculated in step 90 based upon the equations 2–6. The control points for the selected spline segment include the two endpoints of the spline segment and one "off-curve" point defined by the intersection of tangents extending from the endpoints. In contrast, the control points for a line segment are its pair of endpoints. This determination of endpoints for the selected spline segment supplies the coefficients for the conversion of the segment to an implicitly defined parabola.

In step 91, initial values for the pixel coordinates "x" and "y" are selected for the equation (1) to support the calculation for an initial value of the sum Q. The initial values for the pixel coordinates are typically set to the horizontal and vertical distances from the starting point of the spline, i.e., $x_1=0$ and $y_1=0$, to the nearest pixel center located above and to the left of that point. Following this sequence of steps via the node B to step 92, the value for the sum Q is thereafter calculated based upon the values for the coefficients R, S, T, U, and V and the initial values for the pixel coordinates.

To determine whether the initial values for the pixel coordinates are located outside, inside, or on the curve, the calculated value for the sum Q is examined. Specifically, if the value for the sum Q is greater than zero, then the point defined by the pixel coordinates is located outside the spline. In contrast, if the value for the sum Q is less than or equal to zero, then the point defined by the selected pixel coordinates is located inside the spline. If the calculated value for the sum Q is equal to zero, then the point is located on the spline itself. By tracking the values of the sum Q for various pixel coordinates within the first quadrant of the pixel grid, the transitions defined by the intersection of a spline with scan lines can be determined. Each step to a pixel center where the sum Q is less than zero defines an intersection of the spline with a horizontal scan line of the pixel grid, i.e., a horizontal transition.

Thus, upon completing the calculation for the value of the sum Q, an inquiry is conducted at step 93 to determine whether the sum Q is greater than zero. If so, the location on the pixel grid defined by the initial pixel coordinates is located outside the spline segment and, accordingly, the "YES" branch is followed to step 94. To continue "stepping" along the spline segment, a new value for the pixel coordinate "x" is assigned to support another calculation for the sum Q. Specifically, in step 94, a new value for the pixel coordinate "x," designated "$x_{new}$," is assigned by adding an integer value, preferably one pixel unit, to the original value for "x."

In contrast, if the calculated value for the sum Q is less than or equal to zero in decisional step 93, then the "NO" branch is followed from this step to step 95. In this event, the location defined by the initial pixel coordinates is located within the contour of the selected spline. Accordingly, in step 95, a transition entry is stored within the appropriate horizontal transition table based upon the original location of the selected spline segment (see the earlier decision in step 86). To continue the rendering process, a new value for the pixel coordinate "y" is assigned in step 96. Specifically, the new pixel coordinate for "y," designated "$y_{new}$," is assigned by adding an integer value, preferably one pixel unit, to the original value for the pixel coordinate "y." The rendering process then proceeds to step 97 from either step 94 or step 96. In decisional step 97, an inquiry is conducted to determine whether "$x_{new}$" is located on the far right hand edge of the pixel grid and "$y_{new}$" is located on the extreme upper boundary for the pixel grid. In other words, the method tests to see if "$x_{new}$" and "$y_{new}$" are respectively equal to the pixel coordinates defining the "x" and "y" axis boundaries of the pixel grid, namely "$x_{end}$" and "$y_{end}$". If "$x_{new}$" is less than "$x_{end}$" and "$y_{new}$" is less than "$y_{end}$", then the "YES" branch is followed to the step 92 and a new value for the sum Q is calculated based upon the adjusted values for the pixel coordinates. However, if "$x_{new}$" is greater than or equal to "$x_{end}$" and "$y_{new}$" is greater than or equal to "$y_{end}$", then the "NO" branch is followed to step 98 and the rendering process has been completed for the selected spline segment.

Those skilled in the art will appreciate that the above-described loop of steps 92–97 implements a process commonly described as "forward differencing."

Upon completion of the process rendering for the selected spline segment, an inquiry is conducted at step 98 to determine whether remaining segments of the selected spline require rendering. If so, the "YES" branch is followed to step 84 and the above-described process is repeated for another selected segment. If each segment of the selected spline has been rendered, then the "NO" branch is followed from step 98 to step 99.

At decisional step 99, a test is conducted to determine if any remaining splines of the character outline require rendering. If so, the "YES" branch is followed to step 81 and another spline is selected to continue the rendering process. In contrast, if a remaining spline is not available, then the "NO" branch is followed from step 99 to step 100.

In step 100, the entries stored within the "ON" and "OFF" horizontal transition tables are preferably sorted by ascending scan line number to support the subsequent filling of the character bitmap. The process then terminates at step 101. This collection of horizontal transition information by the rendering process supports the filling of the character bitmap by the scan converter based upon the pairing of on- and off-transitions. The character bitmap includes a number of bits equal to the number of pixels within the pixel grid, and bits are set or cleared according to the sense and location of these transitions.

In contrast, if dropout control has been selected in step 85, then both horizontal and vertical scanning operations are conducted by the scan converter. In this event, it is necessary to detect intersections of the contour for both vertical scan lines and horizontal scan lines. Accordingly, the "YES" branch is followed from step 85 via node "A" to step 102. In the sequence of steps 102, 104, 106, and 108, the transition sense associated with a scan line intersection is determined by the original location of the selected segment in the pixel grid. Specifically, transitions for a segment directed up and to the right (the first quadrant) will be stored in the "ON" horizontal transition table and the "OFF" vertical transition table. Transitions for a segment directed up and to the left (the second quadrant) will be stored in the "OFF" horizontal transition table and the "ON" vertical transition table. Transitions for a segment directed down and to the left (third quadrant) will be stored in the "ON" horizontal transition table and the "ON" vertical transition table. Transitions for a segment directed down and to the right (fourth quadrant) will be stored in the "OFF" horizontal transition table and the "OFF" vertical transition table.

In view of the foregoing, in step 102, a test is conducted to determine whether the selected segment is located in the first quadrant. If so, the "YES" branch is followed to step 103 and the "ON" horizontal transition table and the "OFF" vertical transition table are selected for the storage of transitions. If the response to this inquiry is negative, then the "NO" branch is followed to step 104.

In step 104, a test is conducted to determine whether the selected segment is located in the second quadrant. If so, the "YES" branch is followed to step 105 and the "ON" horizontal transition table and the "ON" vertical transition table are selected for the storage of transitions. If the response to this inquiry is negative, then the "NO" branch is followed to step 106.

In step 106, a test is conducted to determine whether the selected segment is located in the third quadrant. If so, the "YES" branch is followed to step 107 and the "OFF" horizontal transition table and the "ON" vertical transition table are selected for the storage of transitions. If the response to this inquiry is negative, then the "NO" branch is followed to step 108. The "OFF" horizontal transition table and the "OFF" vertical transition table are selected for the storage of transitions in step 108.

Upon the selection of the appropriate transition tables in steps 103, 105, 107, or 108, the process proceeds to step 109. The selected spline segment is normalized as required in step 109 by reflecting the selected segment into the first quadrant of the pixel grid.

Using control points for the selected spline segment, the coefficients R, S, T, U, and V for the equation (1) are calculated in step 110 based upon the equations 2–6. This supplies the coefficients for the conversion of the selected spline segment to an implicitly defined parabola.

In step 111, initial values for the pixel coordinates "x" and "y" are selected for the equation (1) to support the calculation for an initial value of the sum Q. As previously described, the initial values for the pixel coordinates are typically set to the horizontal and vertical distances from the starting point of the spline, i.e., $x_1=0$ and $y_1=0$, to the nearest pixel center located above and to the left of that point. The value for the sum Q is thereafter calculated in step 112 based upon the values for the coefficients R, S, T, U, and V and the initial values for the pixel coordinates.

To determine whether the initial values for the pixel coordinates are located outside, inside, or on the curve, the calculated value for the sum Q is examined. Each step to a pixel center where the sum Q is less than or equal to zero defines a horizontal transition. In contrast, each step to a pixel center where the sum Q is greater than zero defines an intersection of the spline with a vertical scan line of the pixel grid, i.e., a vertical transition.

Upon completing the calculation for the value of the sum Q, the process proceeds to step 113 via the node "C". An inquiry is conducted at step 113 to determine whether the sum Q is greater than zero. If so, the location on the pixel grid defined by the initial pixel coordinates is located outside the spline segment and, accordingly, the "YES" branch is followed to step 114. A vertical transition entry is stored within the appropriate vertical transition table in step 114 based upon the original location of the selected spline segment. To continue "stepping" along the spline segment, a new value for the pixel coordinate "x" is assigned to support another calculation for the sum Q. Specifically, in step 115, a new value for the pixel coordinate "x," designated "$x_{new}$," is assigned by adding an integer value, preferably one pixel unit, to the original value for "x."

In contrast, if the calculated value for the sum Q is less than or equal to zero in decisional step 113, then the "NO" branch is followed from this step to step 116. In this event, the location defined by the initial pixel coordinates is located within the contour of the selected spline. Accordingly, in step 116, a horizontal transition entry is stored within the appropriate horizontal transition table based upon the original location of the selected spline segment. To continue the rendering process, a new value for the pixel coordinate "y" is assigned in step 117. Specifically, the new pixel coordinate for "y," designated "$y_{new}$," is assigned by adding an integer value, preferably one pixel unit, to the original value for the pixel coordinate "y."

The rendering process then proceeds to step 118 from either step 116 or step 117. In decisional step 98, a test is conducted to determine if "$x_{new}$" and "$y_{new}$" are respectively equal to the pixel coordinates defining the "x" and "y" axis boundaries of the pixel grid, namely "$x_{end}$" and "$y_{end}$." If "$x_{new}$" is less than "$x_{end}$" and "$y_{new}$" is less than "$y_{end}$", then the "YES" branch is followed to the step 112 and a new value for the sum Q is calculated based upon the adjusted values for the pixel coordinates. However, if "$x_{new}$" is greater than or equal to "$x_{end}$" and "$y_{new}$" is greater than or equal to "$y_{end}$", then the "NO" branch is followed to step 98 and the rendering process has been completed for the selected spline segment.

Briefly reviewing again the steps 98–101, upon completing the process of rendering for the selected spline segment, an inquiry is conducted at step 98 to determine whether remaining segments of the selected spline require rendering. If so, the "YES" branch is followed to step 84 and the above-described process is repeated for another selected segment. If each segment of the selected spline has been rendered, then the "NO" branch is followed from step 98 to step 99. At decisional step 99, a test is conducted to determine if any remaining splines of the character outline require rendering. If so, the "YES" branch is followed to step 81 and another spline is selected to continue the rendering process. In contrast, if a remaining spline is not available, then the "NO" branch is followed from step 99 to step 100. In step 100, the entries stored within the "ON" and "OFF" horizontal and vertical transition tables are preferably sorted by ascending scan line numbers to support the subsequent filling of the character bitmap. The process then terminates at step 101. This collection of horizontal and vertical transition information by the rendering process supports the filling of the character bitmap by the scan converter based upon the pairing of on- and off-transitions.

The above-described process is not useful for rendering straight line segments. Instead, another rendering process based upon the integer Bresenham algorithm is used by the improved scan converter for rendering straight line segments. To avoid applying the spline rendering algorithm to the straight line segment, a straight line segment can be detected during the calculation of the set of coefficients for the polynomial value of the sum Q. Specifically, if the coefficient "α" equals zero, then the selected spline segment is actually a straight line segment. The coefficient "α" is defined by equation (7):

$$(\alpha = x_2 y_3 - y_2 x_3) \tag{7}$$

Figure 9:
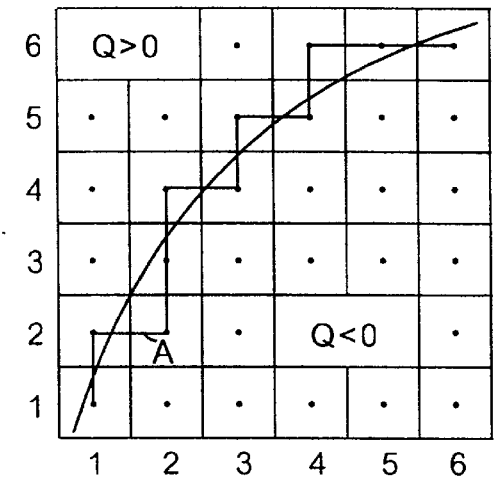
FIG. 9 is a representation of the rendering of a monotonically ascending spline segment located within the first quadrant of a character bitmap.

FIG. 9 illustrates the stair-step rendering function for a monotonically ascending spline segment located within the first quadrant of a pixel grid. Referring to FIG. 9, the stair-step function, which follows or "walks" along the spline segment, illustrates the application of the rendering process shown in FIGS. 8A and 8B to the spline segment. For equation (1), the value for the sum Q is negative "inside" the curve and positive "outside" the curve. For example, the substitution of the pixel coordinates (2, 2) within the equation (1) produces a calculated value of the sum Q less than zero. In contrast, the substitution of the pixel coordinates (1, 2) within the equation (1) produces a calculated value of the sum Q greater than zero.

Step A represents a selected application of the preferred rendering process for the portion of the spline segment located between pixels (1, 2) and (2, 2) and intersected by horizontal scan line number 2. Because the sum Q is greater than zero for the pixel coordinates (1, 2), the rendering process walks along the spline segment via step A and travels one pixel unit in the "x" direction to the pixel coordinates (2, 2). The calculated value for the sum Q is now less than zero because the point (2, 2) is located inside the curve. Thus, a transition is located at the intersection of the spline segment with the horizontal scan line passing through the pixel centers having coordinates (1, 2) and (2, 2), i.e., horizontal scan line number 2. This transition is described as an off-to-on transition or on-transition because the spline in FIG. 9 is directed up and to the right and is therefore located in the first quadrant. Thus, traveling along step A from pixel coordinate (1, 2) to pixel coordinate (2, 2) defines a transition having a transition sense of "ON."

In view of the foregoing, Table 5 defines the transition locations and transition states for the spline segment shown in FIG. 9. Table 5 contains entries for only horizontal scan lines intersecting the selected spline based upon the assumption that dropout control is not selected and, accordingly, vertical scanning is not conducted by the scan converter.

TABLE 5

| Segment Index | Horizontal Scan Line Number | Pixel Coordinates (x,y) | Transition Sense |
|---|---|---|---|
| 1 | 1 | (1, 1) | ON |
| 1 | 2 | (2, 2) | ON |
| 1 | 3 | (2, 3) | ON |
| 1 | 4 | (3, 4) | ON |
| 1 | 5 | (4, 5) | ON |
| 1 | 6 | (6, 6) | ON |

As shown in Table 5, each rendered spline is preferably assigned a unique segment index to support the subsequent reading of stored transition information for that segment. The assignment of an unique segment index is preferably also completed for the rendering of line segments. Based upon the assigned segment index, the transition information stored within the appropriate transition table during the rendering process for a particular segment can be subsequently used to support the dropout control process.

An endpoint is a point that is located at the end of either a straight line segment or a spline segment. When an endpoint of a selected segment falls on a scan line, the improved scan converter applies an endpoint algorithm to define the transition for this endpoint. The endpoint algorithm determines whether a transition is defined by the intersection of the scan line with the endpoint based upon the relative orientation of the splines or lines connected to this endpoint. Prior to reviewing the endpoint algorithm, it will be useful to examine the geometrical cases presented by a representative illustration of an endpoint located on a scan line.

Figure 10:
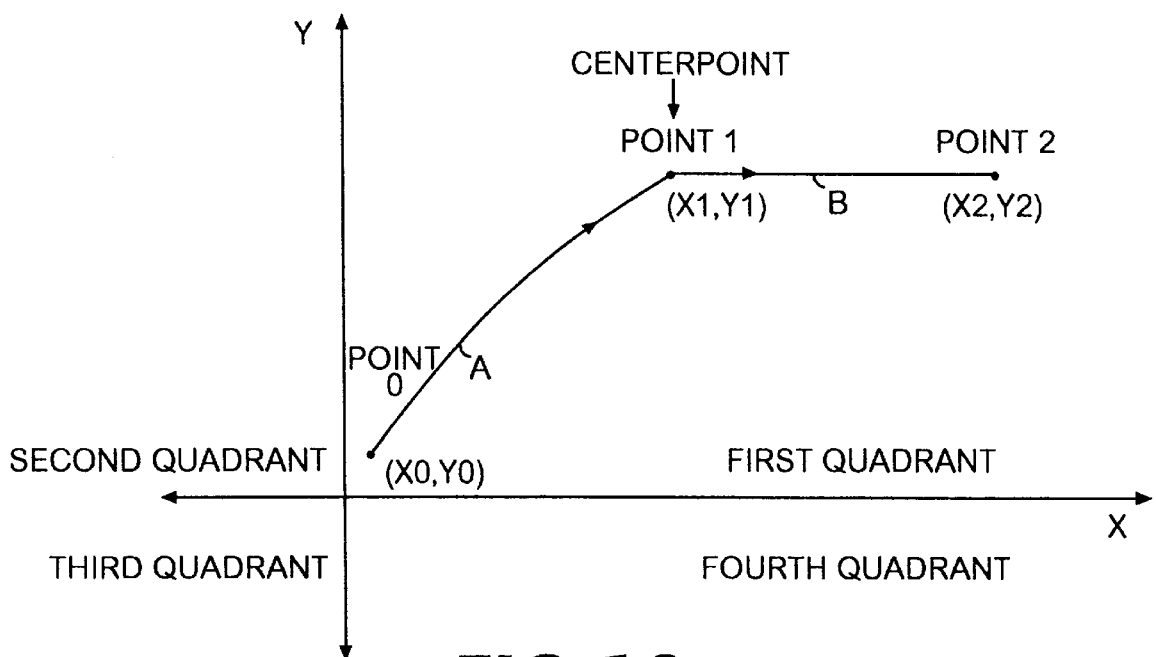
FIG. 10 is a representation of an endpoint located on a scan line and the pair of spline segments approaching and exiting the endpoint.

FIG. 10 illustrates the example of an endpoint located on a scan line and connected between a pair of segments.

Referring to FIG. 10, a segment A is connected to a segment B by an endpoint having pixel coordinates (x1, y1). This centerpoint also represents an endpoint for both segments A and B and is located on the horizontal scan line "y1." The remaining endpoint for segment A is located at pixel coordinates (x0, y0) and the other endpoint for segment B is located at pixel coordinates (x2, y2). To simplify the description of these endpoints, the coordinates (x0, y0) represent point 0, the coordinates (x1, y1) represent point one, which is also described as the centerpoint, and the coordinates (x2, y2) represent point two.

In view of the foregoing, segment A travels from point zero to point one by going up and to the right on the pixel grid. In contrast, segment B travels from point one to point two by traveling horizontally to the right along the "x" axis. Thus, for segment A, x1 is greater than x0 and y1 is greater than y0 and, for segment B, x2 is greater than x1, and y2 is equal to y1. The determination of the transition sense for the transition defined by the intersection of the endpoint with the scan line, specifically point one, can be determined by the geometric relationships of point zero, point one, and point two.

Figure 11:
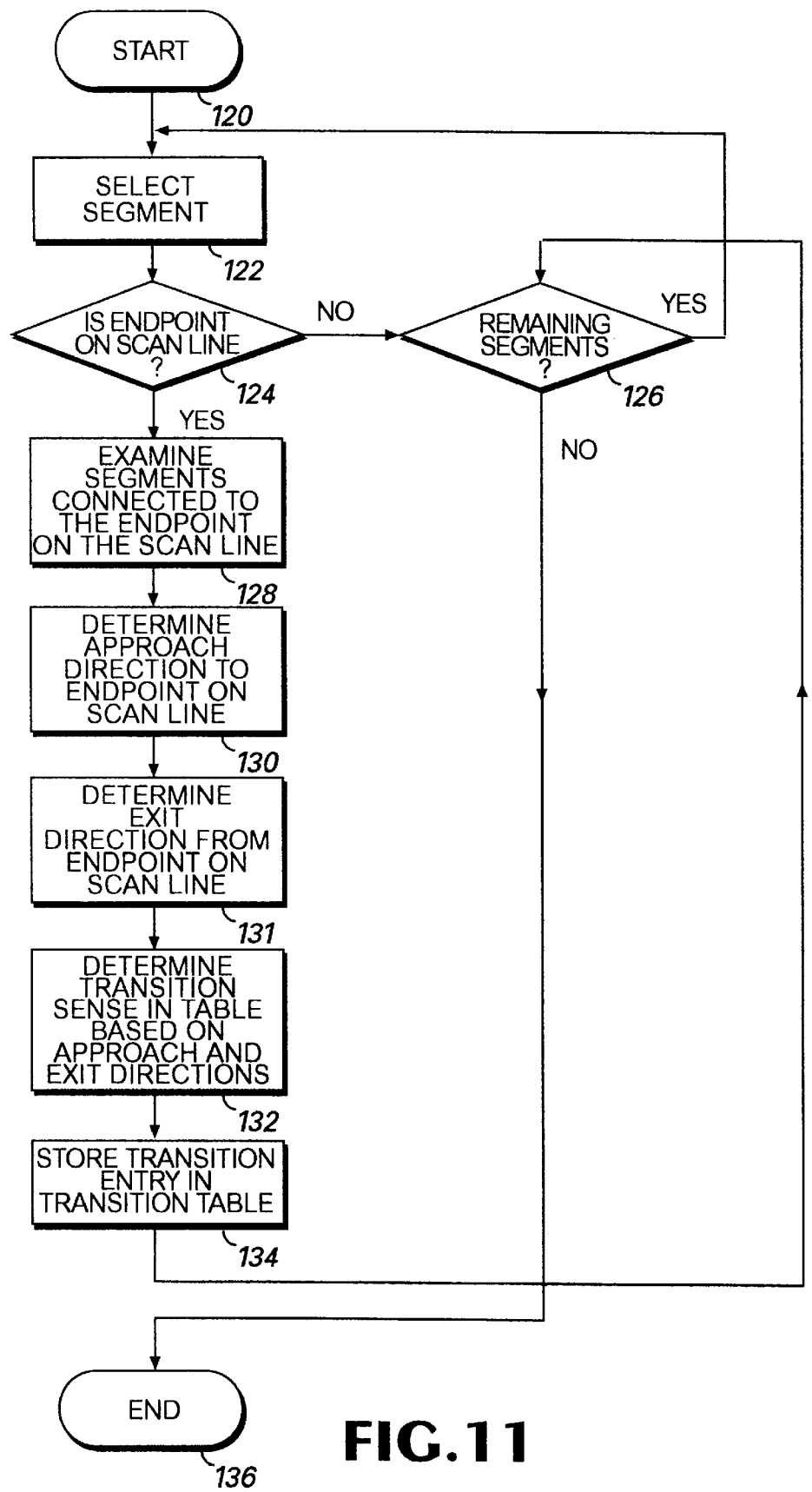
FIG. 11 is a logical flow diagram illustrating the preferred method for determining whether to activate a pixel associated with an endpoint located on a scan line.
Figure 12:
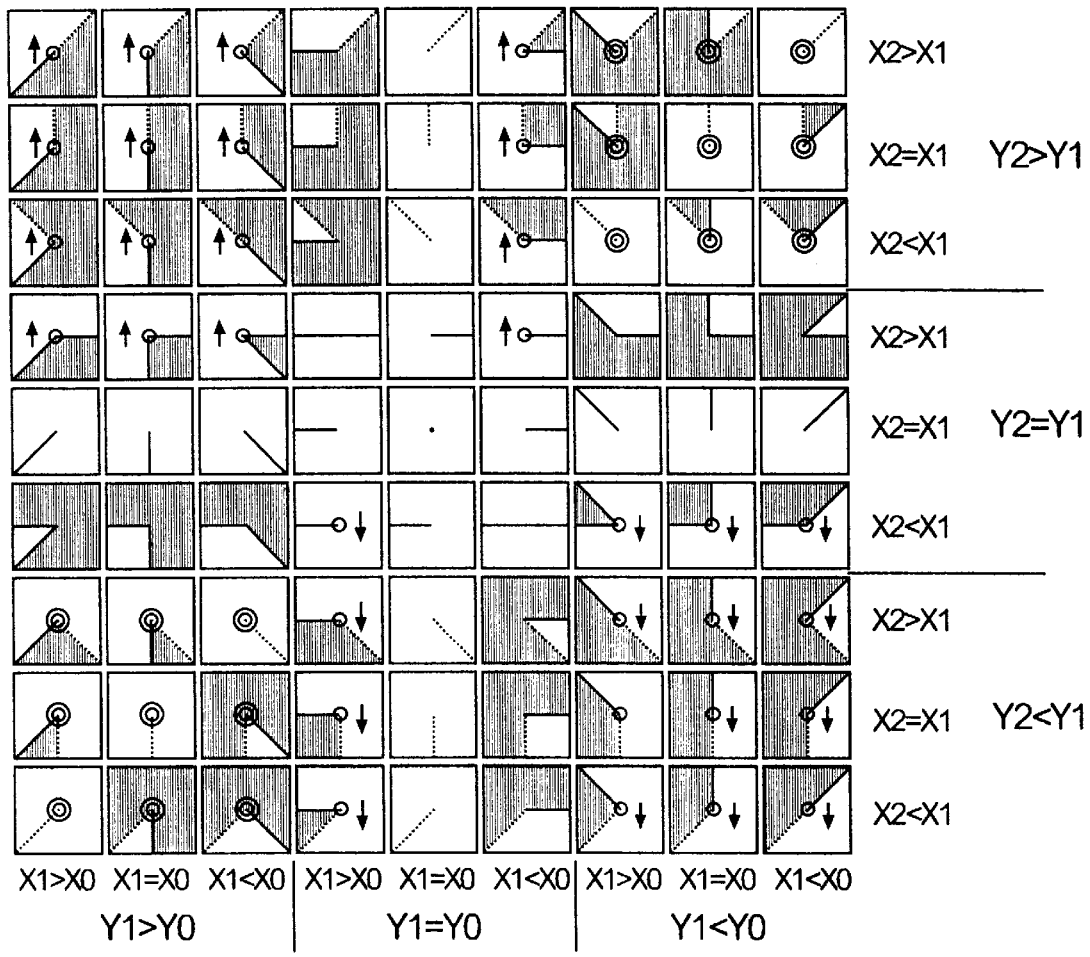
FIG. 12 is a table listing the possible relationships between the coordinates for pairs of adjacent points for connected segments on a pixel grid and the corresponding state of transition for a central point connecting the pair of segments and located on a scan line.

FIG. 11 is a logical flow diagram showing the preferred steps for determining the transition state for an endpoint located on a scan line. FIG. 12 is a table that defines transition states based upon the relationship of the coordinates of three points, specifically (x0, y0), (x1, y1), and (x2, y2). Referring now to FIGS. 10–12, the process for handling an endpoint located on a scan line starts at step 120 and moves to step 122 to select a segment for a contour of a character outline. In step 124, an inquiry is conducted to determine whether an endpoint on the selected segment is located on a scan line. If not, the "NO" branch is followed to decision step 126, where an inquiry is conducted to determine if remaining segments are available for analysis. If the response to this test is affirmative, then the "YES" branch loops back to step 122 and the process begins again. However, if the inquiry generates a negative response, then the "NO" branch is followed to the end of the process at step 136.

If the endpoint is located on a scan line, then the "YES" branch is followed to step 128. In step 128, the segments entering and exiting the endpoint on the scan line are located and the remaining endpoints for these segments are obtained. This defines three sets of endpoints, point 0 and point 1 for the entering segment and point 1 and point 2 for the exiting segment. Each pair of adjacent points define the location of the segments on the pixel grid with respect to the centerpoint, namely the point 1. Accordingly, adjacent points 0 and 1 define the approach direction of segment A to the point 1 and adjacent points 1 and 2 define the exit approach of segment B from point 1.

In steps 130 and 131, the direction of each of the entering and exiting segments is respectively determined by reviewing the relationship of the corresponding pair of adjacent points. For each pair of the adjacent points, the pixel coordinates "x" and "y" may have one of three types of relationships. For example, x1 can be greater than x0, equal to x0, or less than x0. For the representative segments A and B shown in FIG. 10, adjacent points 0 and 1 define a contour moving up and to the right from point 0 to point 1 and the adjacent points 1 and 2 define a segment that is moving horizontally to the right from point 1 to point 2. In other words, for segment A, x1 is greater than x0 and y1 is greater than y0 and, for segment B, x2 is greater than x1 and y2 is equal to y1.

The relationship of the pixel coordinates for each pair of adjacent points supports the determination of the transition state for the endpoint on the scan line in step 132. Based upon these relationships, a transition sense associated with the centerpoint can be located during the step 132 in the table shown in FIG. 12 and a transition entry stored in the appropriate transition table in step 134. The process continues branching to step 126 to determine whether remaining segments are available for analysis. The process concludes at the END step 136.

Reviewing now the table in FIG. 12, the shaded area indicates the inside of a contour, and a circle or circles around the central point, which represents point 1, indicates whether a transition should be generated for the associated endpoint scenario. A single circle with an upward traveling arrow is used to define an on-transition; a single circle with a downward traveling arrow defines an off-transition; and a double circle defines a pixel coordinate having both an on-transition and an off-transition. The coordinate values shown at the bottom and far right of the table define various approach and exit directions for the centerpoint, i.e., the point 1, for the segments connected to this endpoint. Specifically, the table covers all possible relationships between point 0 and point 1 along the bottom edge of the table, and between point 1 and point 2 along the far right edge of the table.

For the representative scenario shown in FIG. 10, x1 is greater than x0 and y1 is greater than y0 because the segment A travels up and to the right from point 0 to point 1 within the first quadrant. This relationship is associated with the far left column of the table. For segment B, x2 is greater than x1 and y2 is equal to y1 because segment B travels to the right along the x axis from point 1 to point 2. Within the far left column of the table, the second relationship defines a table entry located in the fourth row from the top of the far left column. This table entry indicates that the inside of the contour is below and to the right of point 1, and defines a transition sense of an on-transition for the endpoint. Thus, this transition information is preferably stored within the appropriate transition table to support the subsequent filling operation of the scan converter.

Upon completing the rendering of the segment representations of the character outline, the construction of the character bitmap is completed by designating the pixels that should be activated for displaying the image of the character outline on the selected pixel-oriented display device. This process of designating new pixels to be turned on is commonly described as filling the character outline. To "fill" the character outline, the entries within the "ON" and "OFF" transition tables are examined and, for each horizontal scan line, each on-transition is paired with its corresponding off-transition to define the pixels to be activated. For example, for a horizontal scan line, the row of pixels having pixel centers located between each pair of on- and off-transitions is set to be activated or illuminated. However, in the event that the transition tables include an entry designated as both an on-transition and an off-transition, then a dropout condition is associated with this entry. It will be appreciated that scan line intersections are derived from one of three sources, namely line segments, spline segments, and endpoints. Thus, a dropout condition may result from a pair of transitions associated with any of the sources.

FIG. 13A represents a portion of a character outline and having pixels filled prior to the application of dropout control. FIG. 13B represents the character outline of FIG. 13A having pixels filled after the application of dropout control. Referring now to FIG. 13A, a dropout condition has occurred at pixels located at pixel coordinates (4, 5) and (4, 2). For each of these pixels, the pixel center is located outside the area bounded by the pixel boundary and the splines extending through the pixel. This defines a dropout condition because the rendering process will assign both on- and off-transitions to these pixels. Prior to the application of dropout control it will be appreciated that the above-described fill process is not useful for setting the pixels located at (4, 5) and (4, 2) to be turned "on". Thus, without dropout control, the character bitmap for this portion of the character outline may define a relatively distorted image. In contrast, by applying dropout control, the pixels exhibiting a dropout condition are designated to be turned on as shown in FIG. 13B to produce a more aesthetically pleasing display of the image.

The art has developed several approaches for detecting and resolving dropout conditions. For a conventional scan conversion system, a dropout condition is detected in response to locating within the transition tables an entry defining both an on-transition and an off-transition for the same pixel location. This information identifies the affected pixel and supports a determination that a dropout condition exists at the pixel location. However, for certain known scan converters, additional information is not available to support an accurate determination of whether the pair of segments are located to the left or the right of the pixel center for this pixel. In this event, a horizontal scan line convention is followed which requires turning on the pixel located to the right of the last illuminated pixel during a horizontal scan as the scan proceeds from left to right. Similarly, a vertical scan line convention requires turning on the pixel located below the last illuminated pixel during a vertical scan as the scan proceeds from top to bottom through the image.

Another known type of dropout control, which is also described as "smart" dropout control, supplies an improved typographical result based upon a more appropriate selection of the pixel to be turned on to resolve the dropout condition. However, this performance improvement is gained at the expense of additional computations. Upon detecting a dropout condition, the smart dropout control process locates the centerpoint of the segment of the scan line that passes between the pair of contours that pass between the same pixel centers. Based upon this centerpoint, the distance between the centerpoint and each of the adjacent pixel centers is calculated to determine which of the pixel centers is closest to the centerpoint. For the smart dropout control process, the pixel having a pixel center closest to the centerpoint or midpoint is illuminated to correct the dropout condition. The present scan converter provides an improvement for the above-described smart dropout control process by completing transition-related calculations at sub-pixel resolution for only the detected dropout points, thereby reducing the number of sub-pixel resolution calculations.

The improved dropout control process is intended to be used with a scan converter that can test each occurrence of an intersection of scan lines with segments during the rendering operation. For each transition defined by a scan line intersection, the transition location in pixel coordinates forms a transition entry that is stored within the appropriate transition table and referenced by the corresponding scan line number. Accordingly, the scan line number associated with the occurence of a transition can operate as an index to the transition entries in a transition table. During the rendering process, information about a particular segment associated with each transition, which can include the type of segment (spline, line segment, or endpoint intersecting a scan line) and its control point(s), is preferably stored in a separate data array or table. This stored information can be retrieved as required to support the improved dropout control process. Information retrieval is aided by assigning to each of these segments an index number which can be used to locate the stored information corresponding to a particular segment.

A dropout condition is detected in response to locating a pair of transition entries having opposite transition sense values for the same pixel location. Based upon (1) the corresponding scan line numbers for these transition entries and (2) an index number assigned to each of the segments associated with those transition entries, the appropriate pixel coordinates and segment information can be recalled to support a more accurate rendering on a sub-pixel basis the segments associated with this pair of transition entries.

When a dropout condition is detected, information about the associated transition entries is preferably retrieved from their storage locations. The improved scan converter then "recalculates" as required the locations of the transitions at sub-pixel resolution for only those scan coordinates, also described as scan-direction coordinates, which are associated with that dropout condition. Specifically, by solving simultaneous linear equations for line segments and applying a recursive subdivison technique for splines, the intersection of a scan line with each of the selected segments can be determined within 1/64th pixel resolution. If the dropout condition results from a transition associated with an endpoint located on a scan line, the above-described recalculation process is not required and the stored information for this endpoint is retrieved from the appropriate table. The sub-pixel scan direction coordinates for these intersections are then used to obtain the midpoint or centerpoint of the segment of the scan line that crosses the pair of segments. The pixel having the pixel center closest to the midpoint is then selected for illumination to resolve the dropout condition.

In view of this general description of the improved dropout control process, the reader is now referred to FIGS. 14A and 14B for a more detailed presentation of the steps of the improved dropout control process. The process starts at step 150 and a dropout condition is detected at step 151. The dropout condition is typically detected by examining the transition tables and locating a pair of transition entries having opposite transition sense values for the same location on the pixel grid. In response to this detection of a dropout condition, information for a pair of segments associated with such transition entries is retrieved in step 152. This information can be located within the appropriate data storage arrays based upon the scan line number corresponding to these transition entries and the unique index numbers assigned to those segments. In this manner, the stored pixel coordinates for the transitions and associated segment information are recalled for the corresponding segments. It will be appreciated that the stored pixel coordinates within the transition tables typically define the intersection of the scan line with the respective segment within the accuracy of one pixel unit.

The process continues by selecting one of the pair of segments in step 153 to support a more accurate calculation of the scan line intersection at a sub-pixel resolution. However, the technique used to support this calculation is dependent upon the particular source of the scan line intersection. Accordingly, in step 154, an inquiry is conducted to determine whether the selected segment is a spline. If so, the process continues by following the "YES" branch is followed from step 154 to step 158. Recursive subdivision is used in step 158 to calculate a more accurate value of the scan direction coordinate.

In contrast, if the response to the inquiry in step 154 is negative, then the "NO" branch is followed to step 155. Another inquiry is conducted in step 155 to determine whether the selected segment is a line segment. If so, the "YES" branch is followed to step 156 and simultaneous linear equations are solved to calculate a more accurate value of the scan direction coordinate. The calculations completed in steps 156 and 158 result in scan coordinates having sub-pixel accuracy.

It will be appreciated that the recursive subdivision technique and the simultaneous linear equation technique are well known and do not require further explanation within this specification.

If the response to the inquiry in step 155 is negative, the "NO" branch is followed to step 157. In step 157, a determination is made that the selected segment is associated with an endpoint that intersects a scan line. and transition information for the associated endpoint is then retrieved. The scan coordinates associated with this endpoint are sufficiently accurate to support dropout control operations and additional calculations are not required for this situation. From steps 156, 157, or 158, the process continues by proceeding to step 166 via the node "A".

In this manner, the location of the intersection of the scan line with the selected segment is accurately determined with sub-pixel precision. This process preferably defines the transition location associated with the selected segment within 1/64th pixel precision. These scan-direction coordinates are stored within a data array in step 166 and represent a more accurate definition of the location of the intersection between the scan line and the selected segment.

In step 168, the process tests whether a remaining segment is available from the selected pair of segments. If so, the "YES" branch is followed from step 168 to the step 153 and the other segment is obtained to support the calculation of associated scan coordinates having sub-pixel accuracy. However, if the response to the inquiry in step 168 is negative, then the "NO" branch is followed to step 170.

In step 170, the pixel coordinates defining this more accurate definition of the intersection locations for the scan line and the selected spline segments are used to calculate the average location of these scan line intersections. In other words, the midpoint or centerpoint of the segment of the scan line that crosses these selected segments is calculated. Based upon the calculated midpoint, in step 172, the distance between the midpoint and the pixel center for each of the adjacent pixels is calculated. The pixel having the pixel center closest to the midpoint is designated to be turned on to resolve the dropout condition in step 174 and the process concludes at step 176.

It will be appreciated that the improved scan converter uses both line and spline rendering algorithms to calculate a full set of transition locations. In response to the detection of dropout conditions, the process retrieves information about the transition locations associated with the dropout conditions and their corresponding segments to recalculate in sub-pixel accuracy the locations for those transitions. Thus, in contrast to the prior art, the sub-pixel calculations, which tend to be somewhat slower than integer value-based pixel calculations, are completed on a relatively infrequent basis. In this manner, the reduced set of time intensive sub-pixel calculations required for the resolution of a dropout condition minimizes the negative impact of this type of calculation upon the performance of the improved scan converter.

It will be appreciated that the dropout control function for the improved scan converter is an optional control that can be selectively enabled to detect and correct dropout conditions. In general, it is appropriate to turn-off dropout control when characters are large enough such that all contours are at least one pixel wide. Typically, dropout control is used for a particular font below a certain point size, and is turned-off for point sizes that exceed this threshold. However, for certain fonts having many fine details, the dropout control process may remain activated for all point sizes. When dropout control is not used, the size of workspace memory is reduced.

If dropout control is selected, then both vertical and horizontal transition tables are examined for cases where the on-transition is equal to the off-transition to detect a dropout condition. It will be appreciated that a dropout condition can be resolved by setting either of two adjacent pixels. Accordingly, prior to applying dropout control, these pixels can be examined to determine if either pixel has already been set, either by another part of the character outline being filled or by a previous pass of the dropout control algorithm. If either pixel has already been set, then dropout control is typically not applied for the dropout pixel. In contrast, if both of these checks indicate a need for a dropout pixel, then dropout control is preferably applied to resolve the detected dropout condition.

It will be further understood that the improved scan converter can include at least two dropout control modes, a first mode based upon the conventional dropout control technique using the previously-described vertical and horizontal scan line conventions, and a second mode using the improved dropout control method. Because fonts vary based upon their contour widths, the choice of dropout mode is typically determined based upon the font characteristics.

In summary, the present invention provides an improved scan converter to support the efficient and accurate display of character outlines by pixel-oriented display devices. An accurate upper bound for workspace memory is calculated based upon the number of contour reversals and the sense of those reversals for ranges of horizontal scan lines. This accurate estimate of the memory required to support subsequent scan conversion operations enables the conservation of the finite resource of computer memory. By using an implicit spline rendering algorithm based upon a second-order, non-parametric equation, the present invention achieves improvements in speed and character image quality over prior scan converters that use third-order parametric equations. In addition, the present invention efficiently addresses the problem of rendering an endpoint located directly on a scan line by systematically examining the directions of approach and exit to the endpoint to determine whether the pixel associated with this endpoint should be activated. The present invention also provides an improved dropout control method that reduces the number of calculations requiring sub-pixel precision.

From the foregoing, it will be appreciated that the present invention indeed fulfills the need of the prior art described herein above and meets the above-stated objects and advantages. While there has been shown and described the preferred embodiment of the invention, it will be evident to those skilled in the art that various modifications and changes may be made thereto without departing from the spirit and the scope of the invention as set forth in the appended claims in equivalence thereof.

We claim:

1. A method of dropout control for scan conversion of a glyph comprising a plurality of discrete line segments and spline segments, comprising:

detecting each intersection of one of said plurality of said segments, each of said intersections representing a transition entry defined by pixel coordinates and a transition sense value, and placing in response thereto each transition entry into one of a pair of transition tables, said transition tables having opposite transition sense values;

detecting a potential dropout in response to a selected pair of said transition entries generated by first and second ones of said plurality of segments crossing a particular one of plurality of scan lines, said selected pair of transition entries being in said transition tables for a same location of said pixel coordinates through which said particular scan line passes and having opposite transition sense values;

retrieving from said transition tables said pixel coordinates associated with said selected pair of transition entries;

determining with sub-pixel accuracy first scan-direction coordinates for the intersection of said first segment and said particular scan line based upon the type of said first segment;

determining with sub-pixel accuracy second scan-direction coordinates for the intersection of said second segment and said particular scan line based upon the type of said second segment, and determining a pixel having a pixel center nearest to a midpoint between said first and second scan-direction coordinates and activating the pixel having said nearest pixel center.

2. The method recited in claim 1, wherein placing each transition entry into one of said pair of transition tables comprises assigning a unique index number to each transition entry and placing each transition entry within one of said transition tables.

3. The method recited in claim 2, wherein retrieving said pixel coordinates corresponding to each of said pair of transition entries for said first segment and said second segment comprises locating said index number for each of said first segment and said second segment, said pixel coordinates being retrieved to supply an initial set of pixel coordinates for supporting the determination, in sub-pixel coordinates, of said first and second scan-direction coordinates.

4. The method recited in claim 1, wherein determining with sub-pixel accuracy said first scan-direction coordinates for the intersection of said first segment and said particular scan line comprises:

if said first segment is a line segment, then solving simultaneous linear equations to determine with sub-pixel accuracy said first scan-direction coordinates for the intersection of said first segment and said particular scan line; and if said first segment is a spline, then using recursive division to determine with sub-pixel accuracy said first scan-direction coordinates for the intersection of said first segment and said particular scan line.

5. The method recited in claim 4, wherein determining with sub-pixel accuracy said second scan-direction coordinates for the intersection of said second segment and said particular scan line comprises:

if said second segment is a line segment, then solving simultaneous linear equations to determine with sub-pixel accuracy said second scan-direction coordinates for the intersection of said second segment and said particular scan line; and if said second segment is a spline, then using recursive division to determine with sub-pixel accuracy said second scan-direction coordinates for the intersection of said second segment and said particular scan line.

6. A computer-readable medium having computer-executable instructions for performing the method of claim 1.

7. A computer-readable medium having computer-executable instructions for performing the method of claim 5.

8. A computer system adapted to perform the method of claim 1.

9. A method for correcting dropout while scan converting a glyph, comprising:

without calculating sub-pixel coordinates, detecting a first intersection of a first segment of the glyph with a scan line of a pixel grid on which the glyph is superimposed;

storing a first transition entry that includes a first transition sense and first coordinates of a first pixel center adjacent to the first intersection;

without calculating sub-pixel coordinates, detecting a second intersection of a second segment of the glyph with the scan line;

storing a second transition entry that includes a second transition sense and second coordinates of a second pixel center adjacent to the second intersection;

detecting a dropout condition by comparing the first transition entry and the second transition entry;

in response to detecting the dropout condition, calculating first scan-direction coordinates that represent a location of the first intersection in sub-pixel coordinates and calculating second scan-direction coordinates that represent a location of the second intersection in sub-pixel coordinates; and activating a pixel having a pixel center nearest to a midpoint between the first scan-direction coordinates and the second scan-direction coordinates.

10. The method of claim 9, wherein detecting the dropout condition by comparing the first transition entry to the second transition entry comprises determining that the first transition sense is opposite of the second transition sense and the first coordinates of the first pixel center adjacent to the first intersection are identical to the second coordinates of the second pixel center adjacent to the second intersection.

11. The method of claim 10, wherein storing the first transition entry comprises storing the first transition entry in a first transition table for storing transition entries having identical transition senses, and wherein storing the second transition entry comprises storing the second transition entry in a second transition table for storing transition entries having identical transition senses.

12. The method of claim 9, wherein calculating the first scan-direction coordinates comprises:

if the first segment is a spline, then using recursive subdivision to calculate the first scan-direction coordinates; and if the first segment is a line, then solving simultaneous equations to calculate the first scan-direction coordinates; and wherein calculating the second scan-direction coordinates comprises:

if the second segment is a spline, then using recursive subdivision to calculate the second scan-direction coordinates; and if the second segment is a line, then solving simultaneous equations to calculate the second scan-direction coordinates.

13. A computer-readable medium having computer-executable instructions for performing the method of claim 9.

14. A computer-readable medium having computer-executable instructions for performing the method of claim 10.

15. A computer-readable medium having computer-executable instructions for performing the method of claim 12.

16. A computer system adapted to perform the method of claim 9.

* * * * *